United States Patent
Moos

(10) Patent No.: US 11,142,276 B2
(45) Date of Patent: Oct. 12, 2021

(54) MOTORCYCLE MONOSHOCK SYSTEMS

(71) Applicant: COMTECH (COMMUNICATION TECHNOLOGIES) LTD., Weyburn (CA)

(72) Inventor: Christopher Jahn Moos, Addison, TX (US)

(73) Assignee: COMTECH (COMMUNICATION TECHNOLOGIES) LTD., Weyburn (CA)

( * ) Notice: Subject to any disclaimer, the term of this patent is extended or adjusted under 35 U.S.C. 154(b) by 365 days.

(21) Appl. No.: 16/083,456

(22) PCT Filed: Mar. 7, 2017

(86) PCT No.: PCT/US2017/021185
§ 371 (c)(1),
(2) Date: Sep. 7, 2018

(87) PCT Pub. No.: WO2017/156020
PCT Pub. Date: Sep. 14, 2017

(65) Prior Publication Data
US 2019/0071148 A1 Mar. 7, 2019

Related U.S. Application Data

(60) Provisional application No. 62/304,896, filed on Mar. 7, 2016.

(51) Int. Cl.
*B62K 25/28* (2006.01)
*B62K 11/04* (2006.01)

(52) U.S. Cl.
CPC ............ *B62K 25/283* (2013.01); *B62K 11/04* (2013.01)

(58) Field of Classification Search
CPC .............................. B62K 25/283; B62K 11/04
USPC .................................................. 180/219, 227
See application file for complete search history.

(56) References Cited

U.S. PATENT DOCUMENTS

| 2008/0169134 A1* | 7/2008 | Tomolillo | ............ B62K 25/283 |
| | | | 180/6.24 |
| 2008/0169149 A1* | 7/2008 | Holroyd | ................. B62K 11/06 |
| | | | 180/227 |
| 2013/0264134 A1* | 10/2013 | Matsuda | ................. B60L 53/80 |
| | | | 180/68.1 |

(Continued)

*Primary Examiner* — Anne Marie M Boehler
(74) *Attorney, Agent, or Firm* — Messner Reeves LLP

(57) ABSTRACT

A monoshock mount assembly allows conversion of the rear suspension system of a motorcycle from any existing configuration to a monoshock configuration that uses a single shock absorber. The monoshock mount assembly replaces factory-standard frame and suspension components. A body mount assembly attaches to existing attachment points of the motorcycle frame and provides structural support for bodywork, electrical and suspension components, and Other components. A swing arm pivotably attaches to the motorcycle frame and provides a lower shock mount, which may be offset from the centerline of the motorcycle. An upper brace attaches to the same attachment points as the body mount assembly and provides an upper shock mount that cooperates with the lower shock mount to mount the single shock absorber in a position where the shock absorber can operate normally without contacting motorcycle components supported by the body mount assembly.

5 Claims, 23 Drawing Sheets

(56) References Cited

U.S. PATENT DOCUMENTS

| | | | |
|---|---|---|---|
| 2015/0122568 A1* | 5/2015 | Eguchi | B62H 1/02 180/220 |
| 2015/0129342 A1* | 5/2015 | O'Rourke | F16M 13/02 180/219 |
| 2020/0079459 A1* | 3/2020 | Mercier | B60L 15/20 |

* cited by examiner

MOTORCYCLE MONOSHOCK SYSTEMS

CROSS-REFERENCE TO RELATED APPLICATIONS

This patent application represents the U.S. national phase entry of International Application No. PCT/US2017/021185 filed Mar. 7, 2017, which claims the benefit of U.S. Prov. Pat. App. Ser. No. 62/304,896, filed under the same title on Mar. 7, 2016, and incorporated fully herein by reference.

FIELD OF THE DISCLOSURE

This disclosure relates to shock mount assemblies for a motorcycle. The disclosure relates particularly to a replacement shock mount assembly for a motorcycle rear wheel.

BACKGROUND OF THE DISCLOSURE

Production motorcycles have suspension systems for the rear tire that generally fall into one of two categories: a dual shock suspension system uses two shocks—typically coilovers—one on each side of the rear wheel; a single shock or "monoshock" system uses one shock, which is typically mounted in line with the central plane of the motorcycle and can be oriented in several different positions within that plane. The selection and configuration of the rear suspension system depends heavily on the intended use of the motorcycle, as well as its weight and dimensions. Independent of application, monoshock systems have some advantages over dual shock systems such as lower weight and more consistent tuning due to having only one shock instead of two.

SUMMARY OF THE DISCLOSURE

The present disclosure describes devices and systems that facilitate modifying a motorcycle so that it employs a monoshock-type rear suspension system. The modification can be made to motorcycles having a dual shock, a monoshock, or another type of rear suspension. In particular, illustrated and described embodiments provide a replacement shock mount assembly, including a replacement rear body mount assembly, a bracing member with an upper shock mount, and a swing arm with a lower shock mount, for Harley Davidson motorcycles made in the year 1985 or after. Even more particularly, the described and illustrated shock mount assembly is designed to bolt onto the frame, using existing factory attachment points for a rear subframe, of any Harley Davidson motorcycle made in the year 2009 or after.

BRIEF DESCRIPTION OF HE DRAWINGS

The following drawings are submitted with this patent application.

DETAILED DESCRIPTION

Figure 1:
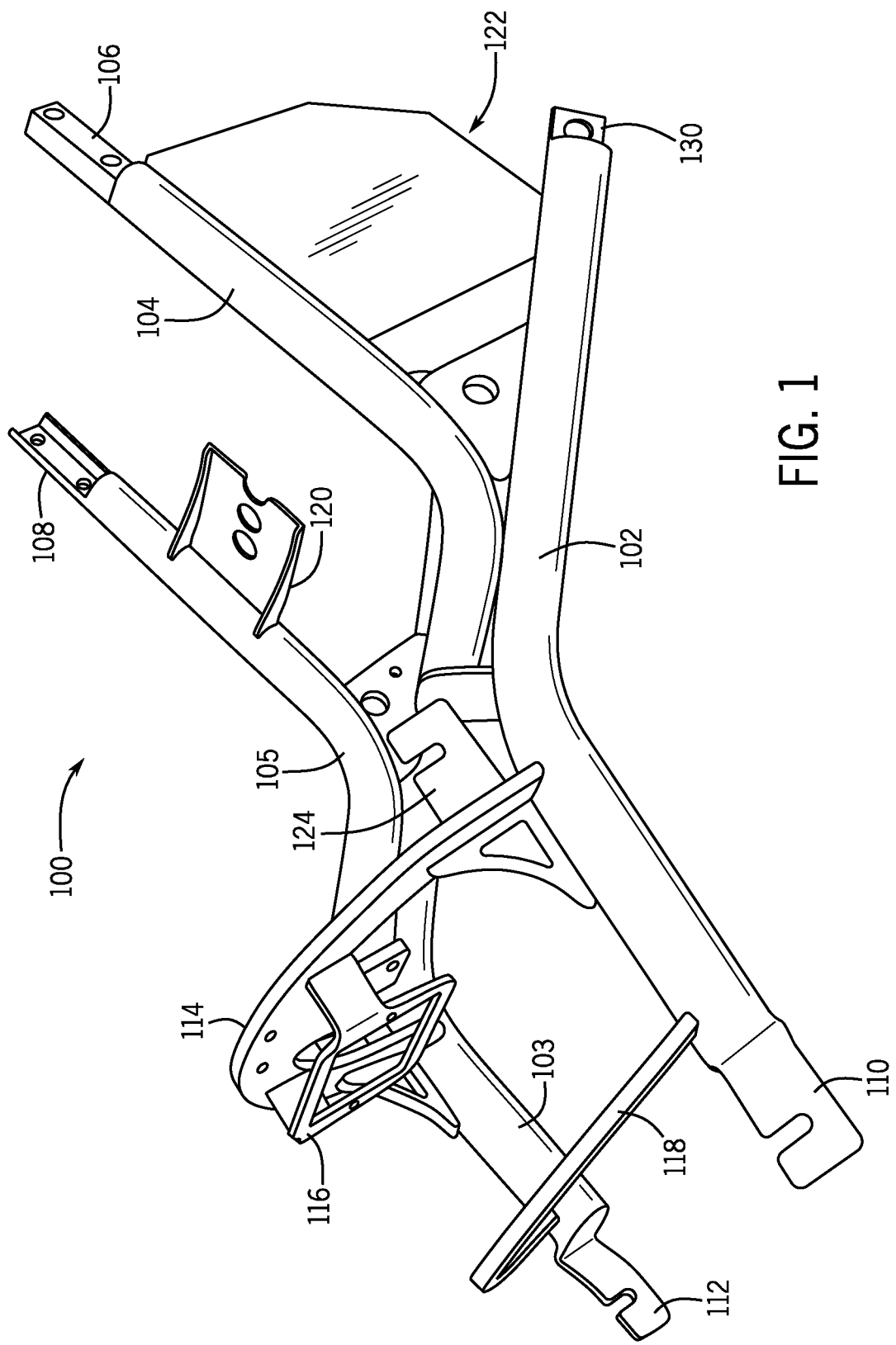
FIG. 1 is a rear-top-right perspective view of a first embodiment of a replacement body mount assembly for use in the present shock mount assembly.
Figure 2:
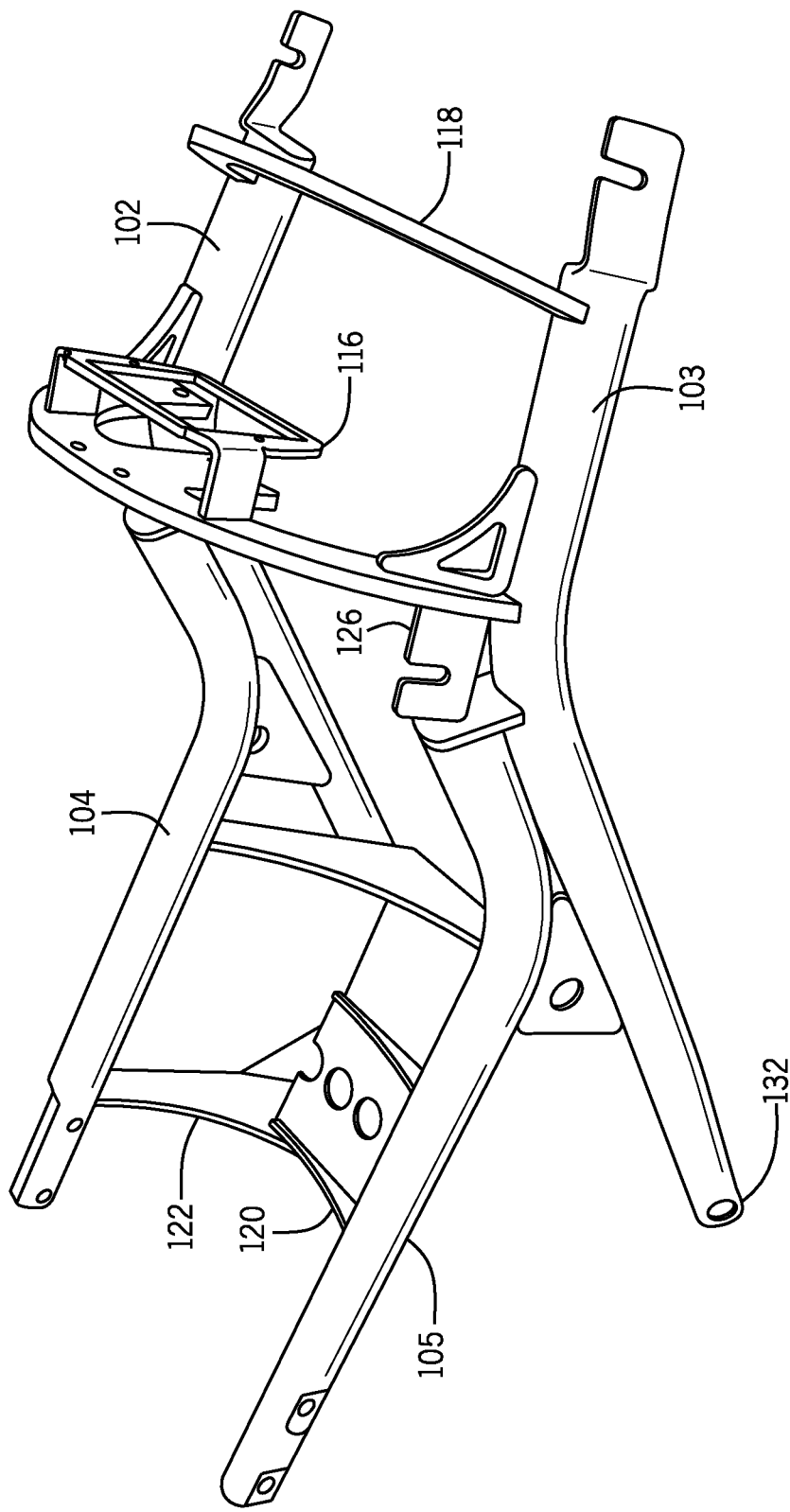
FIG. 2 is a rear-top-left perspective view of the body mount assembly of FIG. 1.
Figure 3:
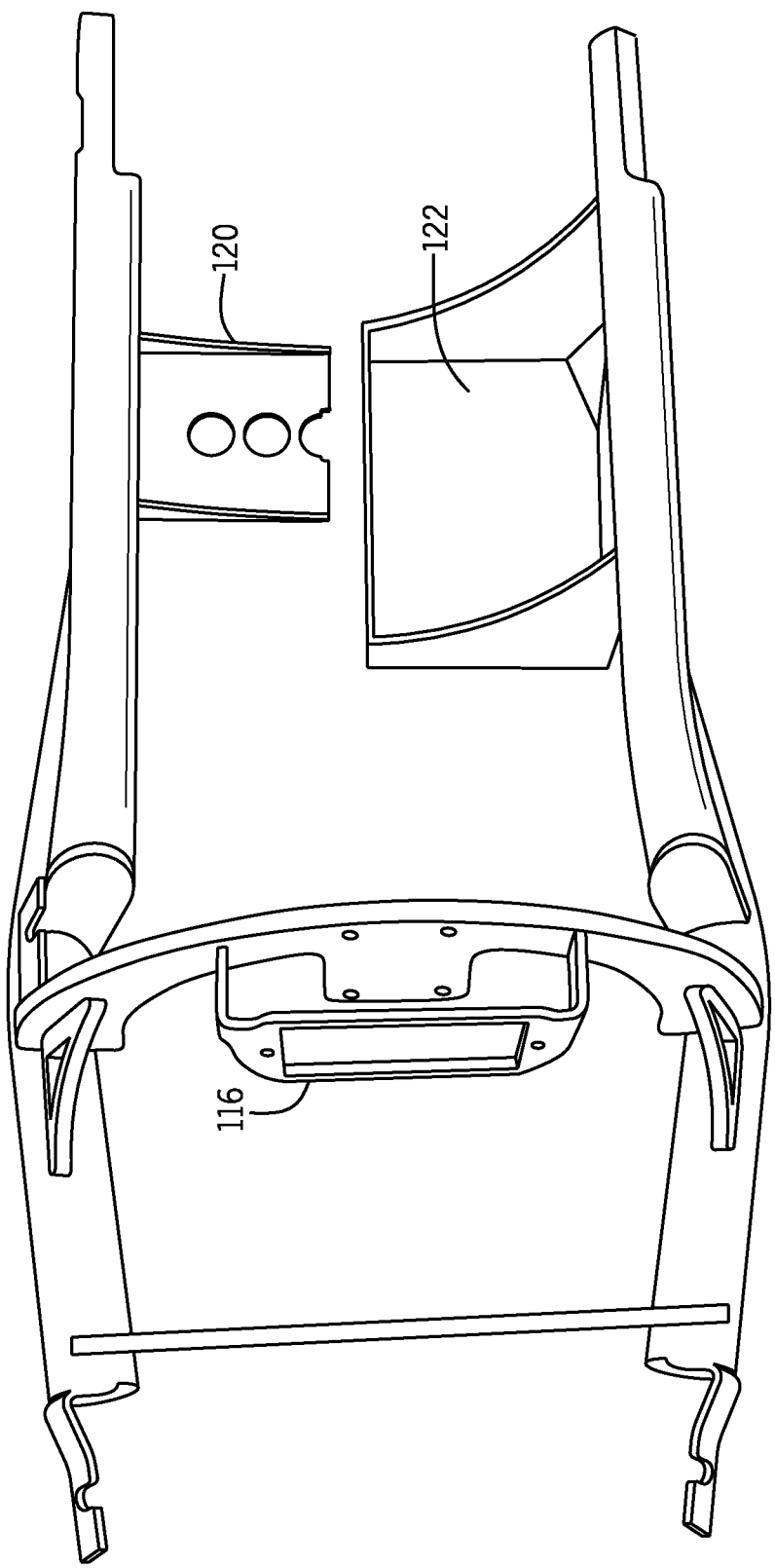
FIG. 3 is a top view of the body mount assembly of FIG. 1.
Figure 4:
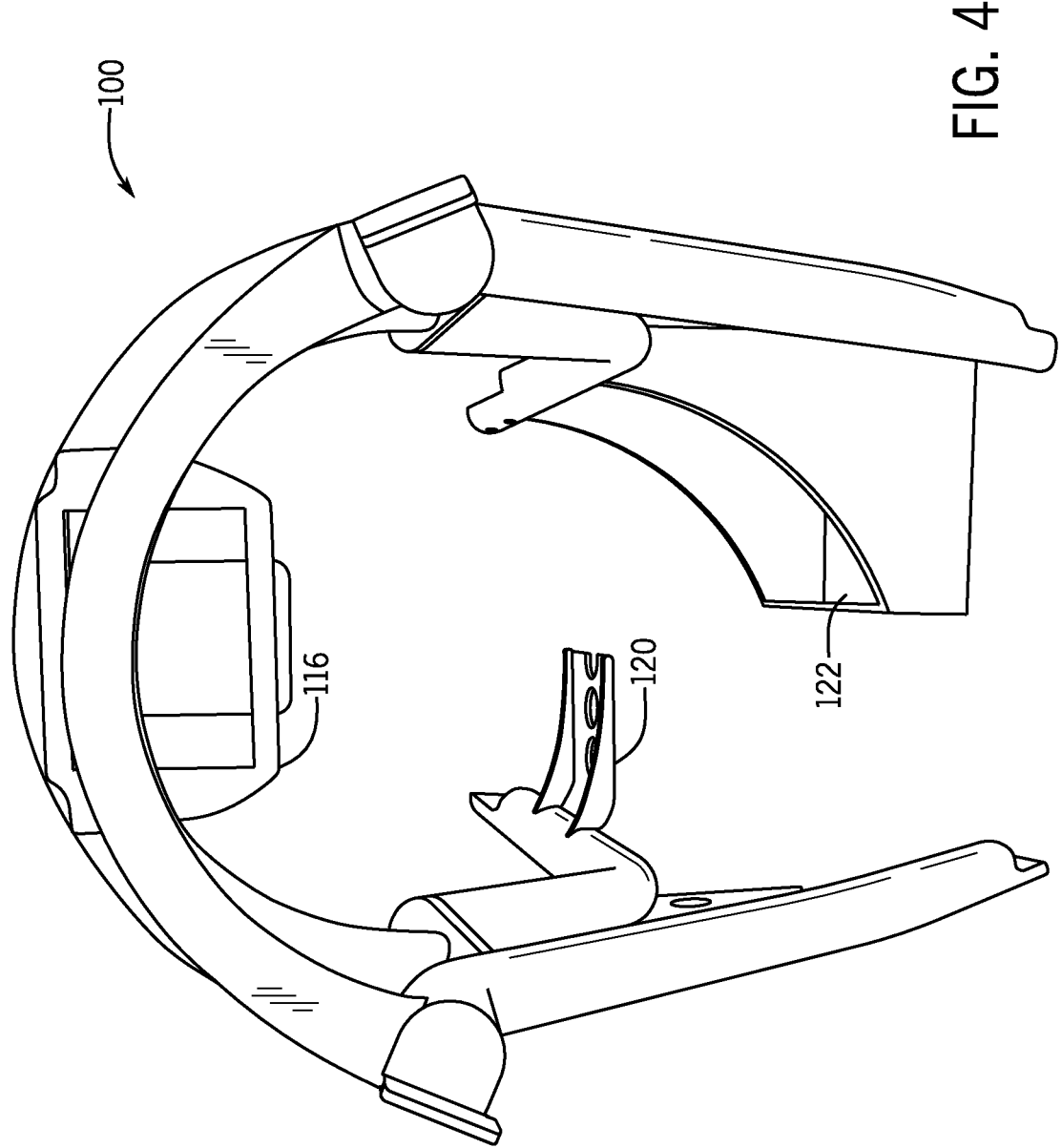
FIG. 4 is a rear view of the body mount assembly of FIG. 1.

FIGS. 1-20 illustrate various embodiments of the present monoshock mount assemblies for replacing existing shock mount assemblies in the rear suspension system and/or rear subframes attached to a "main" frame of a motorcycle. Generally, the presently described monoshock mount assemblies may be suitably configured for installation on any preferred motorcycle, in particular as an aftermarket modification to motorcycles having monoshock or dual-shock rear suspension systems. For example, the present assemblies may replace the factory or existing rear body mount assembly of the motorcycle. The factory or existing rear shock mount assembly, rear subframe, and other rear body mount assembly components may be removed from the frame of the motorcycle, and the present monoshock mount assembly may be installed as described and illustrated herein. In some embodiments, the present monoshock mount assembly may be mounted to the motorcycle frame without modifying the motorcycle frame, such as by using standard or otherwise pre-existing attachment points. For example, the assembly may re-use the attachment points by which the factory rear subframe was attached to the frame. Installing the monoshock assembly may including installing the monoshock and any corresponding components, such as a shock manifold, air valve assembly, air compressor, and the like. The rear wheel may then be reinstalled into the installed monoshock mount assembly, before or after finishing steps such as grinding, welding, painting, and installation of bodywork components. Non-limiting exemplary embodiments are shown and described herein.

In various embodiments, the present disclosure provides a replacement shock mount assembly for a motorcycle having a factory configuration that includes a frame and a rear subframe attached to the frame via a plurality of attachment points. The replacement shock mount assembly includes: a body mount assembly that structurally supports one or more bodywork components of the motorcycle, the body mount assembly having a first front member that attaches to the frame at a first of the plurality of attachment points, a second front member that attaches to the frame at a second of the plurality of attachment points, the second front member spaced a first distance laterally from the first front member, a first brace spanning the first distance and providing structural support to the body mount assembly, a battery mount that structurally supports a battery of the motorcycle, the battery mount attached to the first front member and a manifold mount that structurally supports one or both of a manifold and a valve assembly, the manifold mount attached to the second front member; a swing arm that pivotably attaches at a proximal end to the frame and at a distal end to a rear wheel of the motorcycle, the swing arm having a lower shock mount that pivotably attaches to a distal end of a shock absorber, the lower shock mount positioned offset from a centerline of the motorcycle; and, an upper brace that attaches to the frame and pivotably attaches to a proximal end of the shock absorber, the upper brace, the swing arm, and the body mount assembly cooperating to provide a monoshock, suspension of the motorcycle.

The first front member may position the battery mount and the second front member may position the manifold mount, and the upper and lower shock mounts may be offset laterally from the centerline, such that while the shock absorber operates to dampen the pivoting of the swing arm with respect to the frame, the shock absorber maintains at least a minimum clearance from the battery mounted in the battery mount and from the valve assembly mounted in the manifold mount. The body mount assembly may further include a third front member that attaches to the frame at a third of the plurality of attachment points and cooperates with the first front member to support a first bodywork panel, and a fourth front member that attaches to the frame at a fourth of the plurality of attachment points, that is spaced a second distance laterally from the third front member, and that cooperates with the second front member to support a second bodywork panel. The battery mount may be attached to the third front member. The upper brace may be a tubular member extending the first distance and terminating in a first mounting bracket attaching to the frame at the first attachment point and a second mounting bracket attaching to the frame at the second attachment point; the upper brace may have an upper shock mount that aligns laterally with the lower shock mount and pivotably attaches to the proximal end of the shock absorber.

In another aspect, the present disclosure provides an apparatus for providing a monoshock rear suspension system in a motorcycle having a frame and a rear subframe attached to the frame via a plurality of attachment points. The apparatus includes: a swing arm configured to pivotably attach to the frame, to mount a rear wheel of the motorcycle, and to connect to a shock absorber supported by the frame, the connecting enabling the shock absorber to operate in a monoshock configuration to dampen pivoting of the swing arm with respect to the frame; and, a body mount assembly configured to attach to the frame in replacement of the rear subframe. The swing arm may include a lower shock mount that pivotably attaches to a distal end of the shock absorber. The lower shock mount may be offset laterally from a centerline of the motorcycle. The lower shock mount may be disposed on a top surface of the swing arm.

The apparatus may further include an upper brace that attaches to the frame, the upper brace having an upper shock mount that pivotably attaches to a proximal end of the shock absorber. The upper brace may attach to the frame via one or more of the plurality of attachment points. The upper shock mount may be offset laterally from a centerline of the motorcycle. The swing arm may include a retainer bracket disposed on a bottom surface of the swing arm and connecting to a brake caliper mounted to the rear wheel.

The body mount assembly may attach to the frame via one or more of the plurality of attachment points. The body mount assembly may include one or more mounts that each support a corresponding component of a plurality of components within an interior of the motorcycle, the body mount assembly and the swing arm cooperating to maintain, during operation of the shock absorber, a minimum clearance between the shock absorber and the corresponding components supported by the one or more mounts.

In yet another aspect, the present disclosure provides a method of installing a monoshock rear suspension system on a motorcycle, the method including the steps of: detaching and removing a rear subframe attached to a frame of the motorcycle via a plurality of attachment points; attaching a replacement body mount assembly to the frame in place of the rear subframe, the replacement body mount assembly configured to maintain, during operation of a shock absorber supported by the frame, at least a minimum clearance between the shock absorber and one or more components within the motorcycle; attaching a swing arm to the frame such that the swing arm pivots with respect to the frame, the swing arm configured to mount a rear wheel of the motorcycle; and, attaching a distal end of the shock absorber to the swing arm in a monoshock configuration.

Attaching the replacement body mount may entail attaching the replacement body mount to the frame via the plurality of attachment points. The method may further include attaching an upper brace to the frame and to the body mount assembly via one or more of the plurality of attachment points, and attaching a proximal end of the shock absorber to the upper brace. The swing arm may have a lower shock mount laterally offset from a centerline of the motorcycle, and attaching the distal end of the shock absorber may entail attaching the distal end of the shock absorber to the lower shock mount. The method may farther include the steps of: attaching an upper brace to the frame, the upper brace comprising an upper shock mount, such that the upper shock mount is laterally aligned with the lower shock mount; and attaching a proximal end of the shock absorber to the upper shock mount.

Referring to FIGS. 1-4, a monoshock mount assembly may include a replacement body mount assembly 100 designed to attach to a motorcycle frame and to provide attachment structures for mounting motorcycle components, such as bodywork, air valve assemblies and other suspension system components, a battery and other electrical system components, and the like. The body mount assembly 100 may include rear frame members 102, 103 extending toward the rear of the motorcycle, and front frame members 104, 105 attached to or integral with the rear frame members 102, 103 and extending toward the front of the motorcycle. The frame members 102-105 may each terminate with a mounting bracket, which may be bolt holes as in brackets 106 and 108, mounting tabs as in brackets 110 and 112, or another mounting bracket configuration. The rear frame members 102, 103 may terminate at the forward ends in mounting brackets 130, 132, and the front frame members 104, 105 may terminate at the forward ends in mounting brackets 106, 108. The mounting brackets 106, 108, 130, 132 may facilitate attaching the body mount assembly 100 to the motorcycle frame using attachment points, as shown and described by example herein. Additional brackets, such as rear brackets 110, 112 formed at the rearward ends of the rear frame members 102, 103, and intermediate brackets 124, 126 attached to any of the frame members 102-105 or to a brace (e.g., brace 114), may further attach to the motorcycle frame, or may provide attachment points for bodywork components and/or for mechanical devices such as drive system and/or suspension system components. For example, any of a rear fender, a body panel, a seat, a luggage rack, and a storage component may attach to one or multiple of the brackets 110, 112, 124, 126.

One or more arcuate braces 114, 118 may extend between any two opposite frame members 102-105 to provide support to the body mount assembly 100. The exemplary braces 114, 118 of FIGS. 1-4 extend between the rear frame members 102, 103, providing lateral strength to the body mount assembly 100 as well as a mounting surface for the intermediate brackets 124, 126. One or more of the braces 114, 118 may also support bodywork components such as a rear fender, a body panel, a seat, a luggage rack, or a storage component; a mounting bracket 116 may mount a tail light assembly, a brake assembly, control module(s) for lights or other electronic components etc. (see air suspension compressor 550 of FIG. 5). A manifold mount 120, such as for an air valve assembly as described below, may extend from one of the frame members 102-105. A battery mount 122 may also extend from one of the frame members 102-105. See FIGS. 14 and 15, described below.

Figure 5:
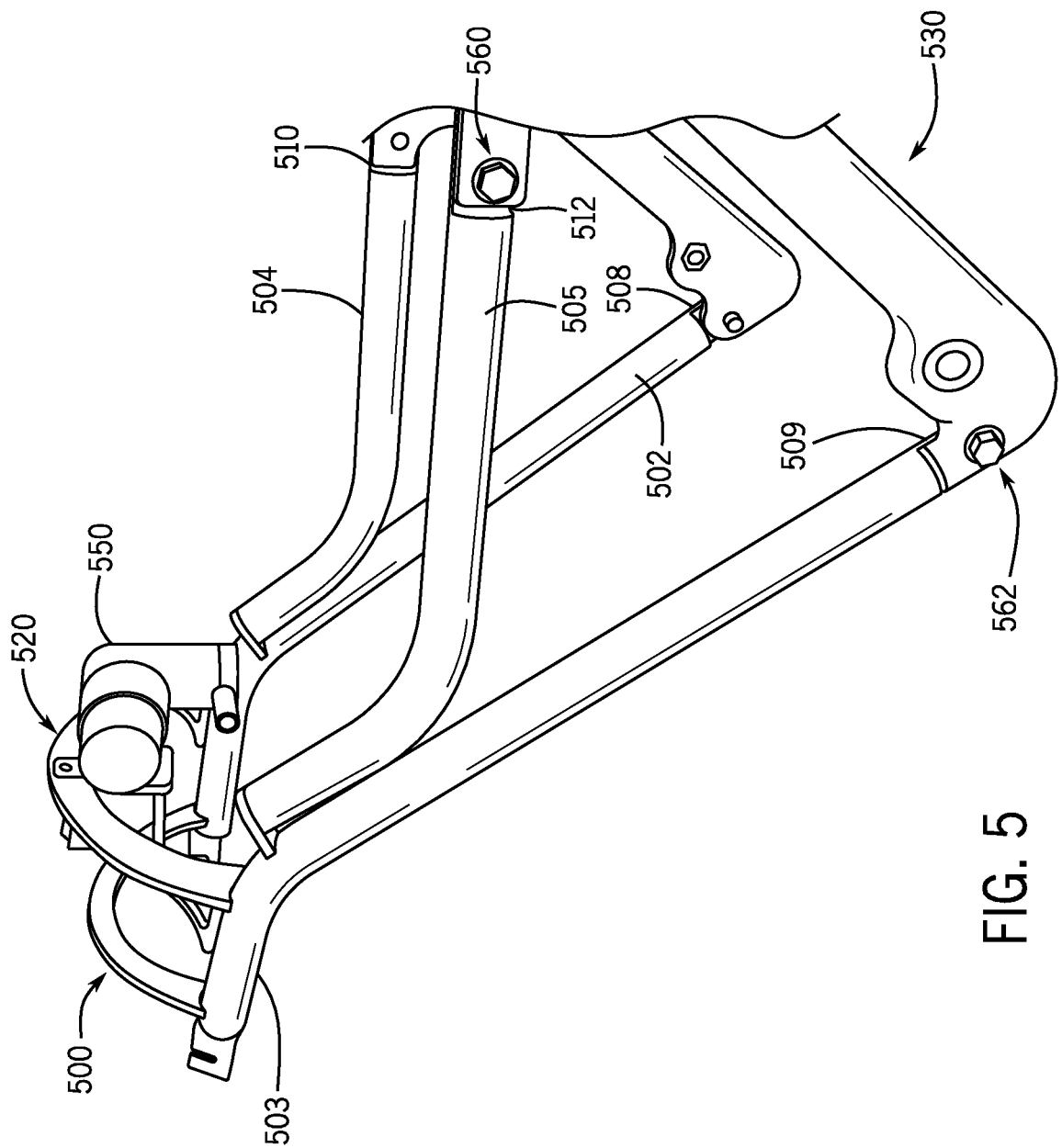
FIG. 5 is a right side view of another embodiment of a replacement body mount assembly shown mounted on a motorcycle frame.
Figure 6:
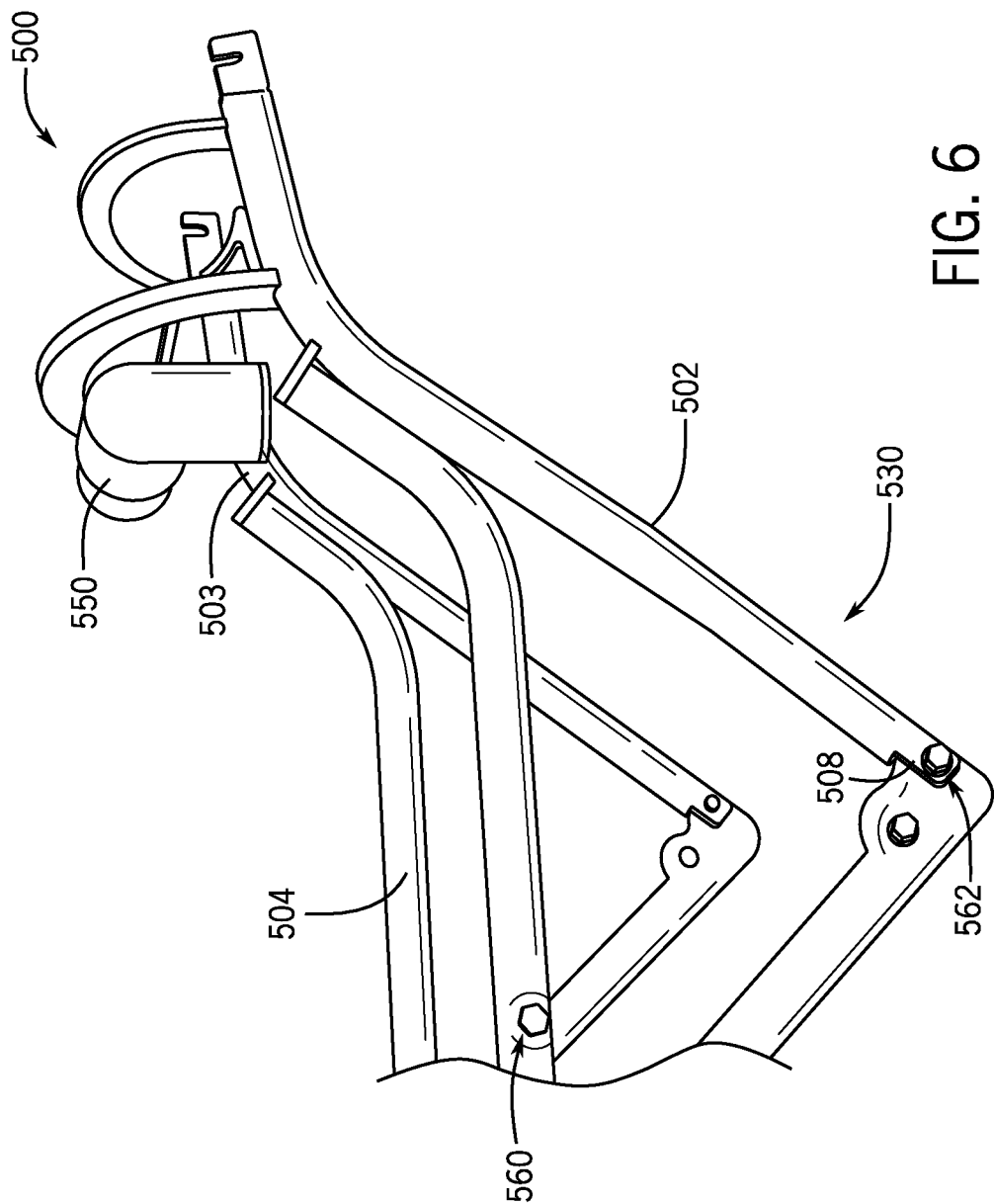
FIG. 6 is a left side view of the body mount assembly of FIG. 5.

FIGS. 5 and 6 illustrate an exemplary embodiment of a replacement body mount assembly 500 attached to a frame 530 of a motorcycle. In particular, forward brackets 508, 509 (corresponding to the brackets 130, 132 of FIG. 1) of the rear frame members 502, 503 (corresponding to the members 102, 103 of FIG. 1), and forward brackets 510, 512 (corresponding to the brackets 106, 108 of FIG. 1) of the front frame members 504, 505 (corresponding to the members 104, 105 of FIG. 1) attach via bolts to attachment points 560, 562 on the motorcycle frame 530. In some embodiments, these attachment points 560, 562 may be the same attachment points to which a factory- or otherwise previously-installed rear subframe was attached. In various other embodiments, the body mount assembly 500 may be otherwise permanently attached (e.g., via welds) or removably attached to the frame 530. An air compressor 550 for an air suspension system is shown attached to a brace 520 extending between the rear frame members 502, 503 (and corresponding to brace 114 of FIG. 1).

Figure 7:
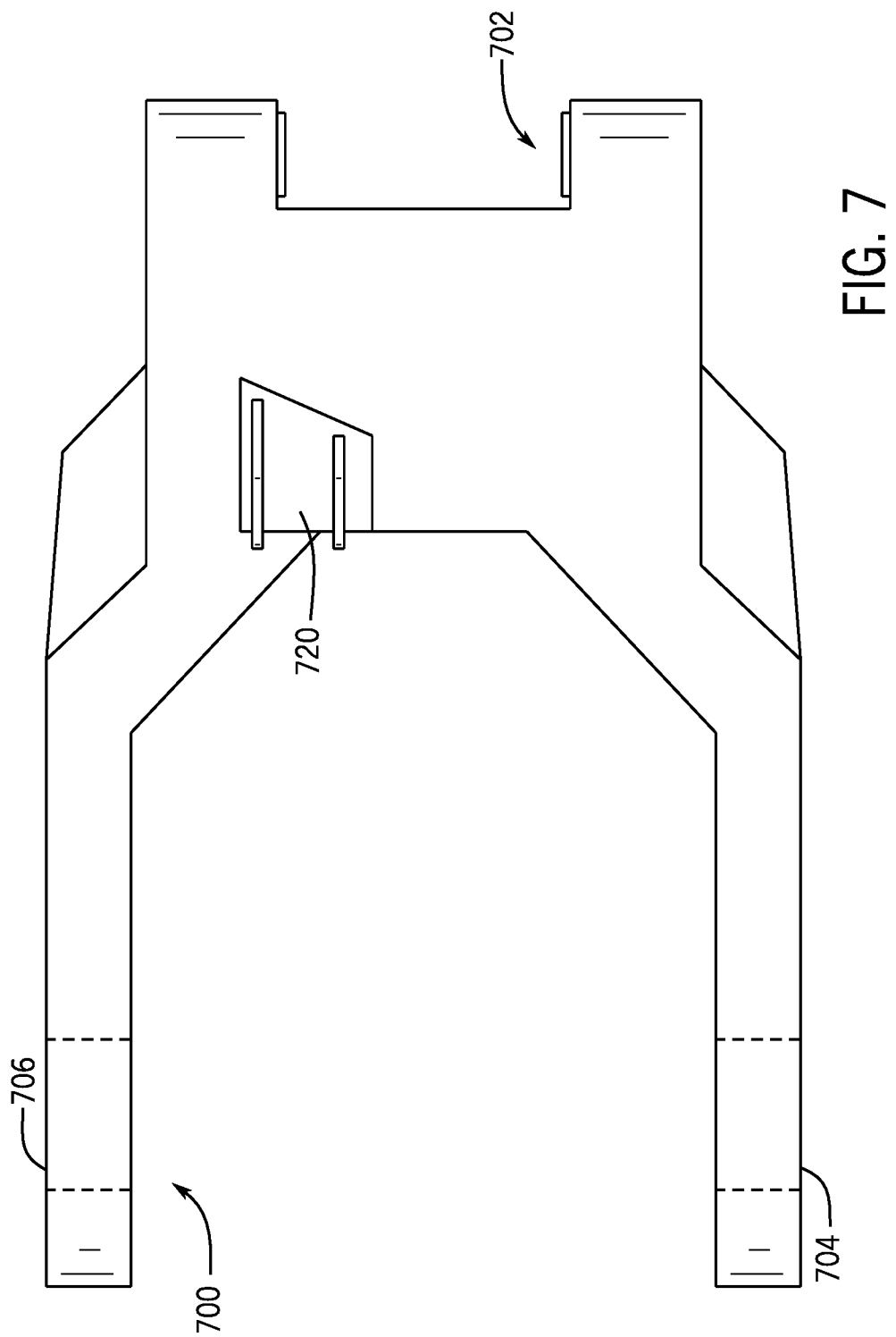
FIG. 7 is a top view of an embodiment of a swing arm with a lower shock mount.
Figure 8:
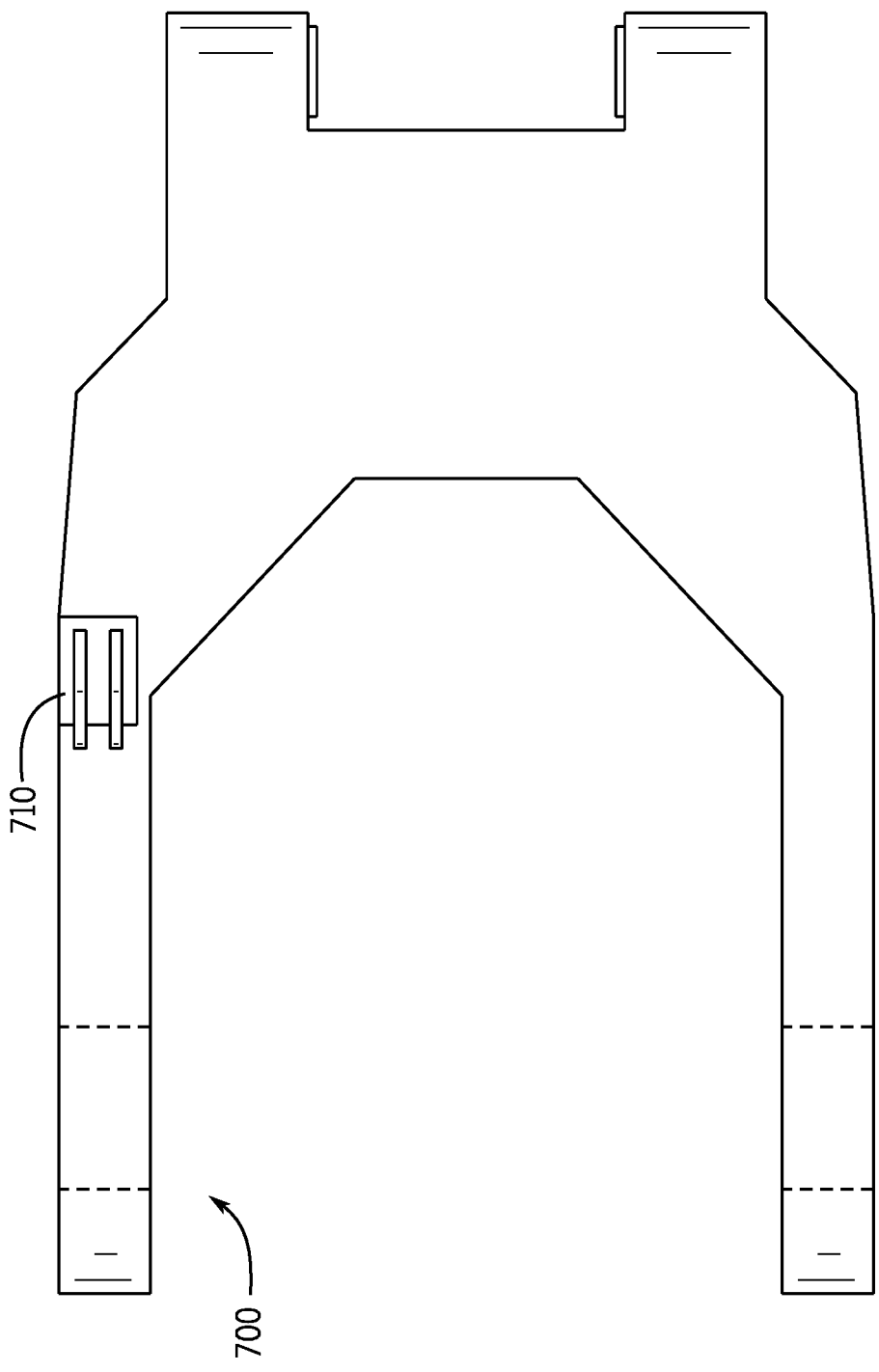
FIG. 8 is a bottom view of the swing arm of FIG. 7.
Figure 9:
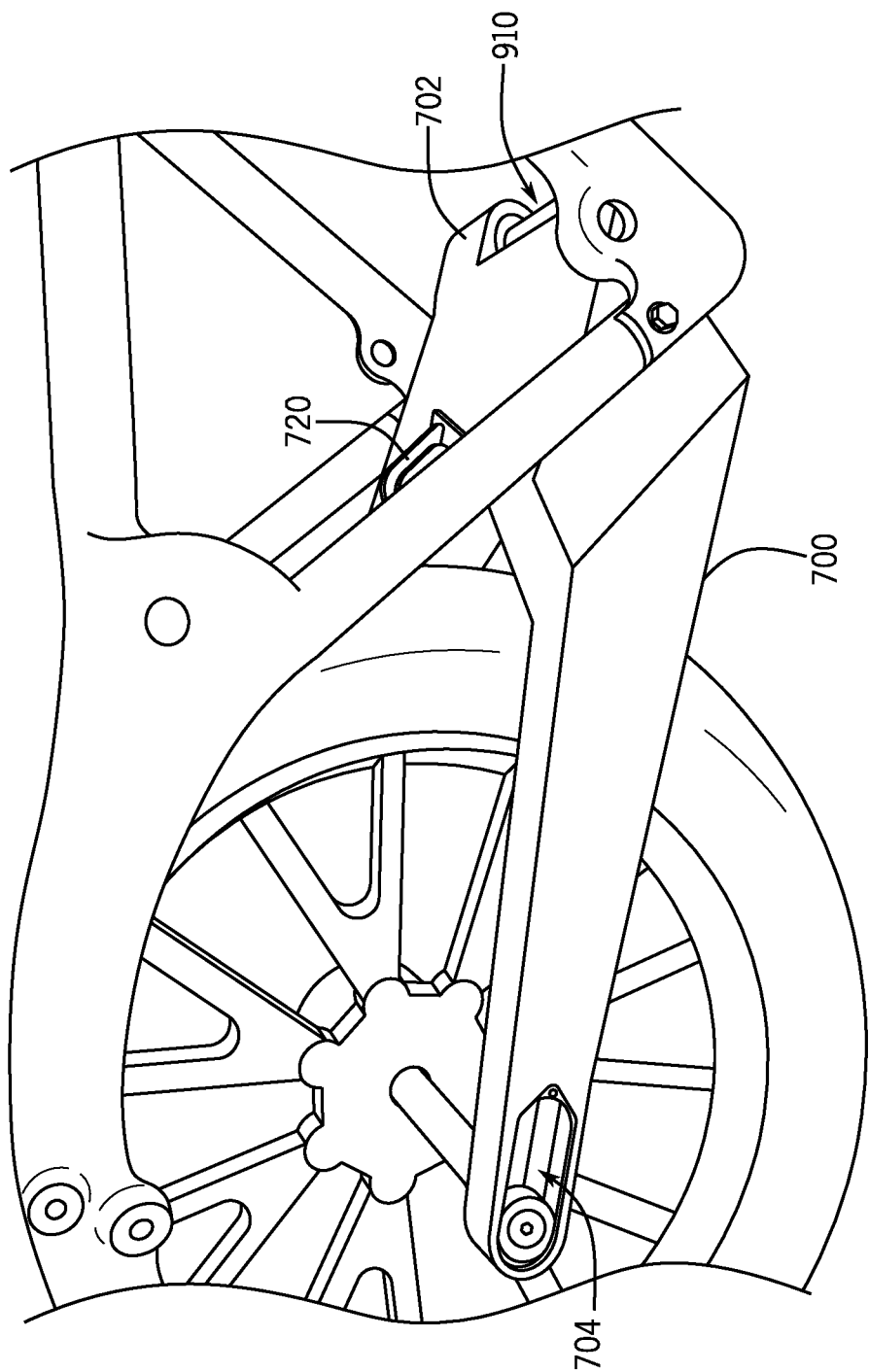
FIG. 9 is a top-right perspective view showing the swing arm of FIG. 7 installed on a motorcycle frame with a rear wheel of the motorcycle mounted to the swing, arm.
Figure 10:
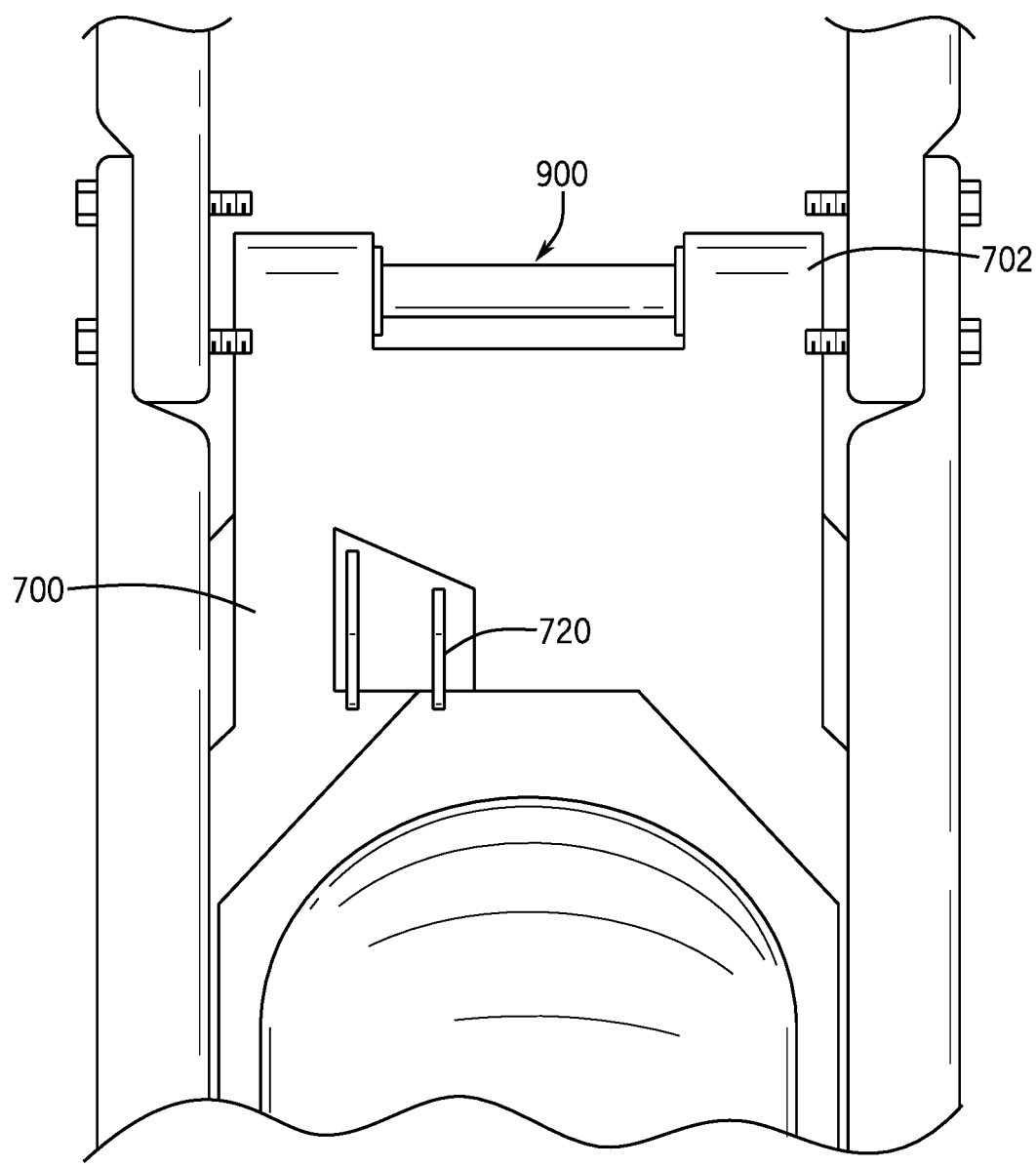
FIG. 10 is a top view of the installed swing arm of FIG. 9.
Figure 11A:
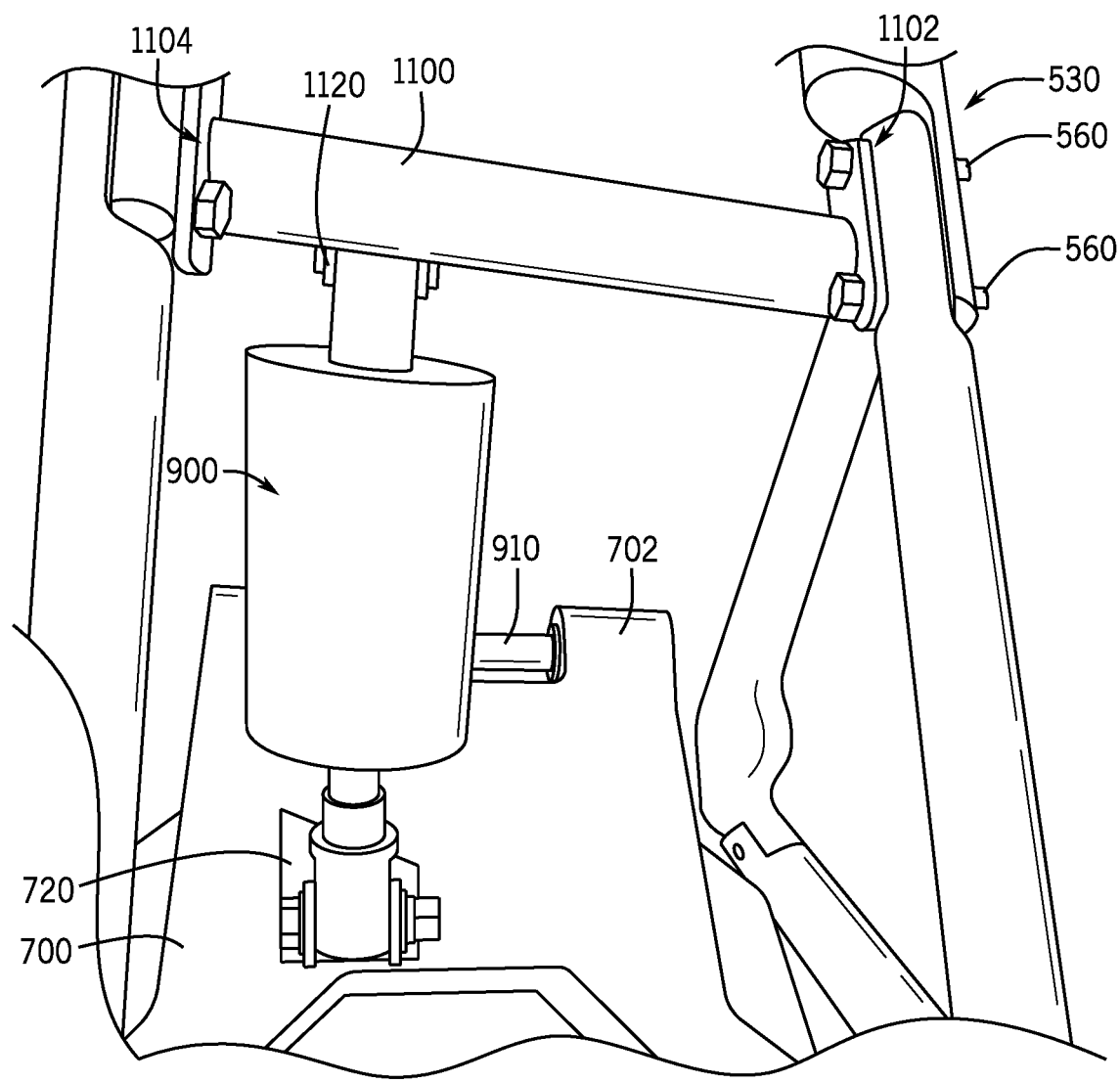
FIG. 11A is a top view of the installment of FIG. 10 showing a monoshock mounted to the swing arm and to an upper shock mount of the present shock mount assembly.
Figure 11B:
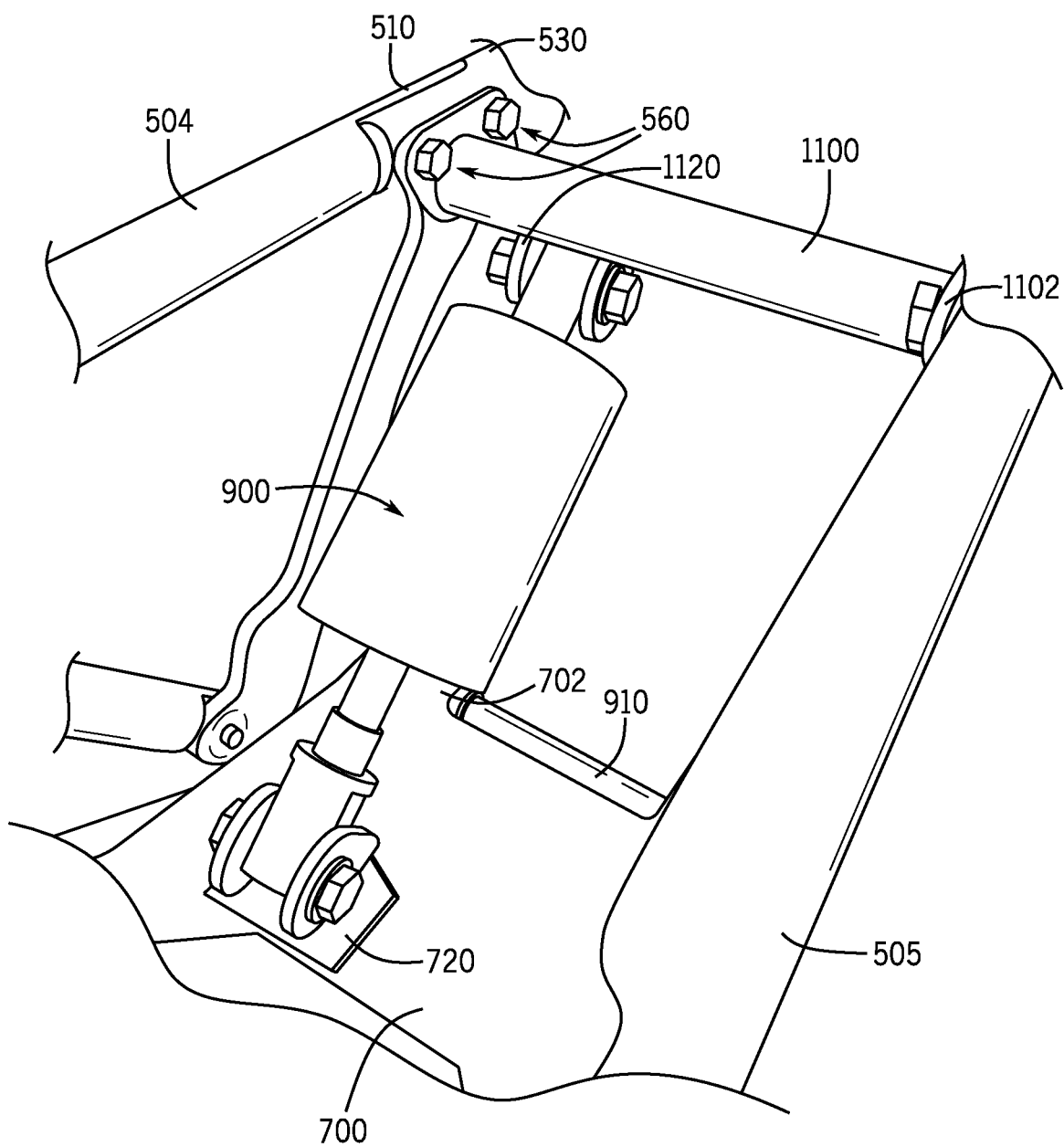
FIG. 11B is a top-rear-right view of the installment of FIG. 11A.
Figure 11C:
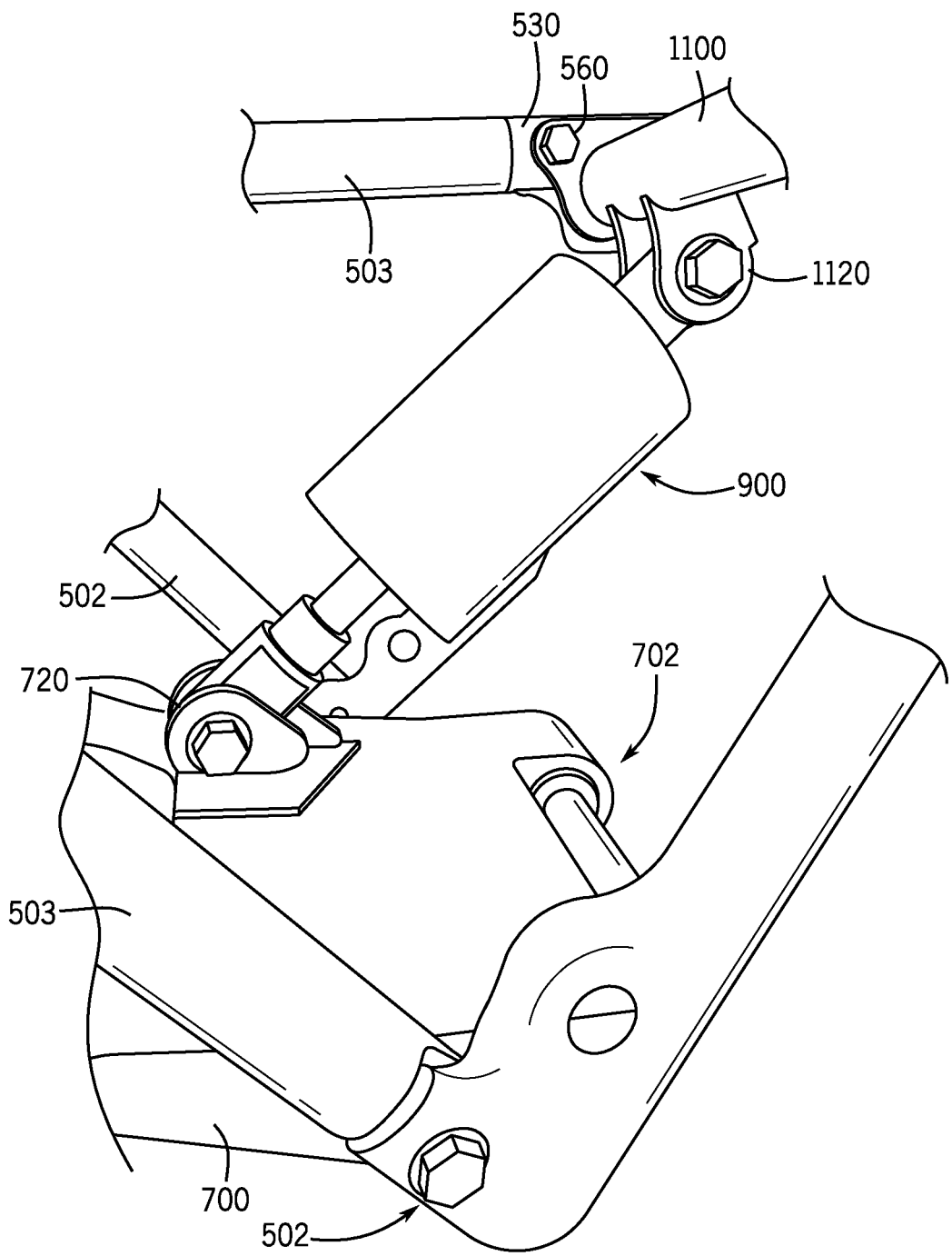
FIG. 11C is a right side view of the installment of FIG. 11A.
Figure 12:
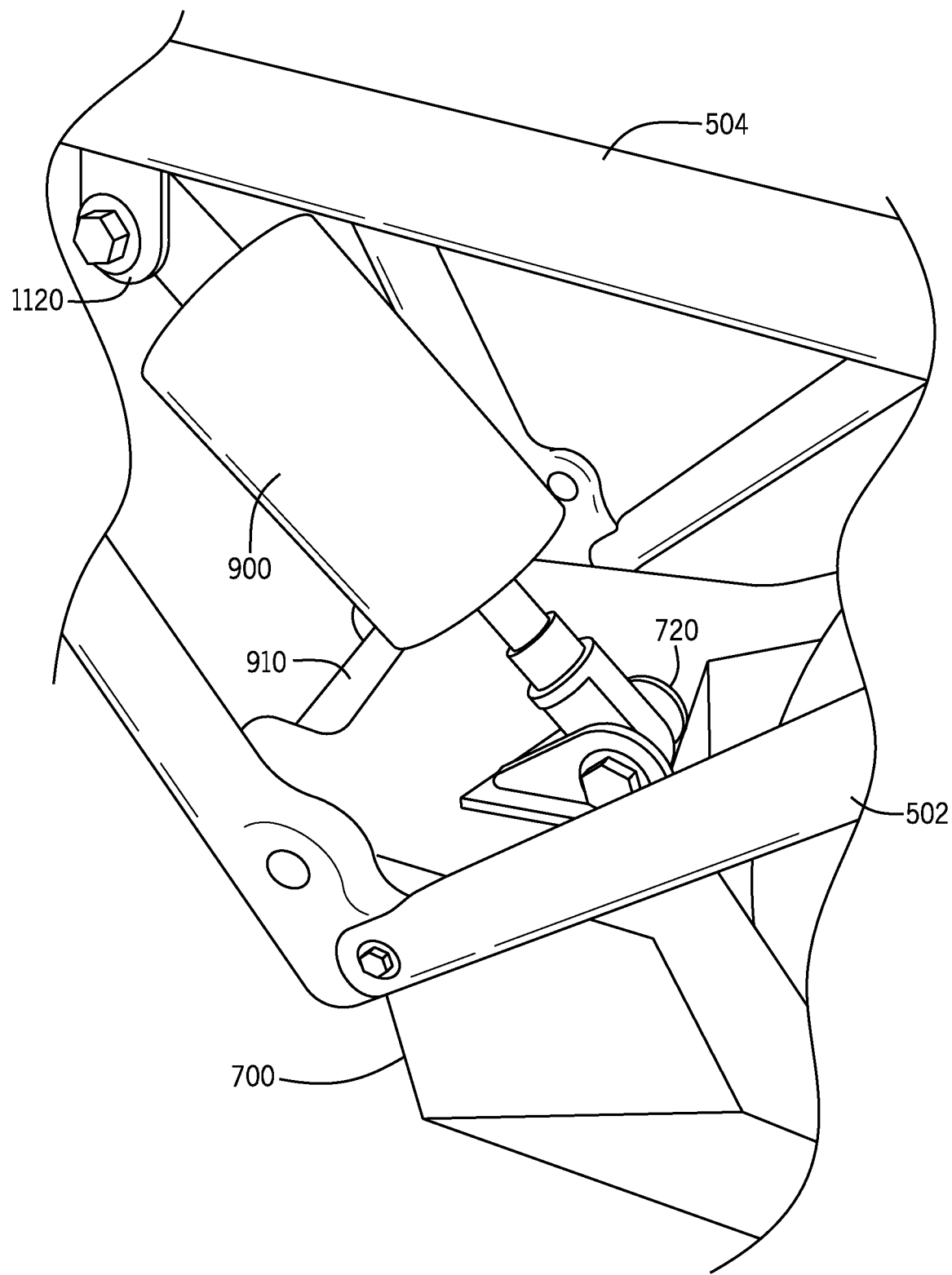
FIG. 12 is a top-left perspective view of the installment of FIG. 11A.
Figure 13:
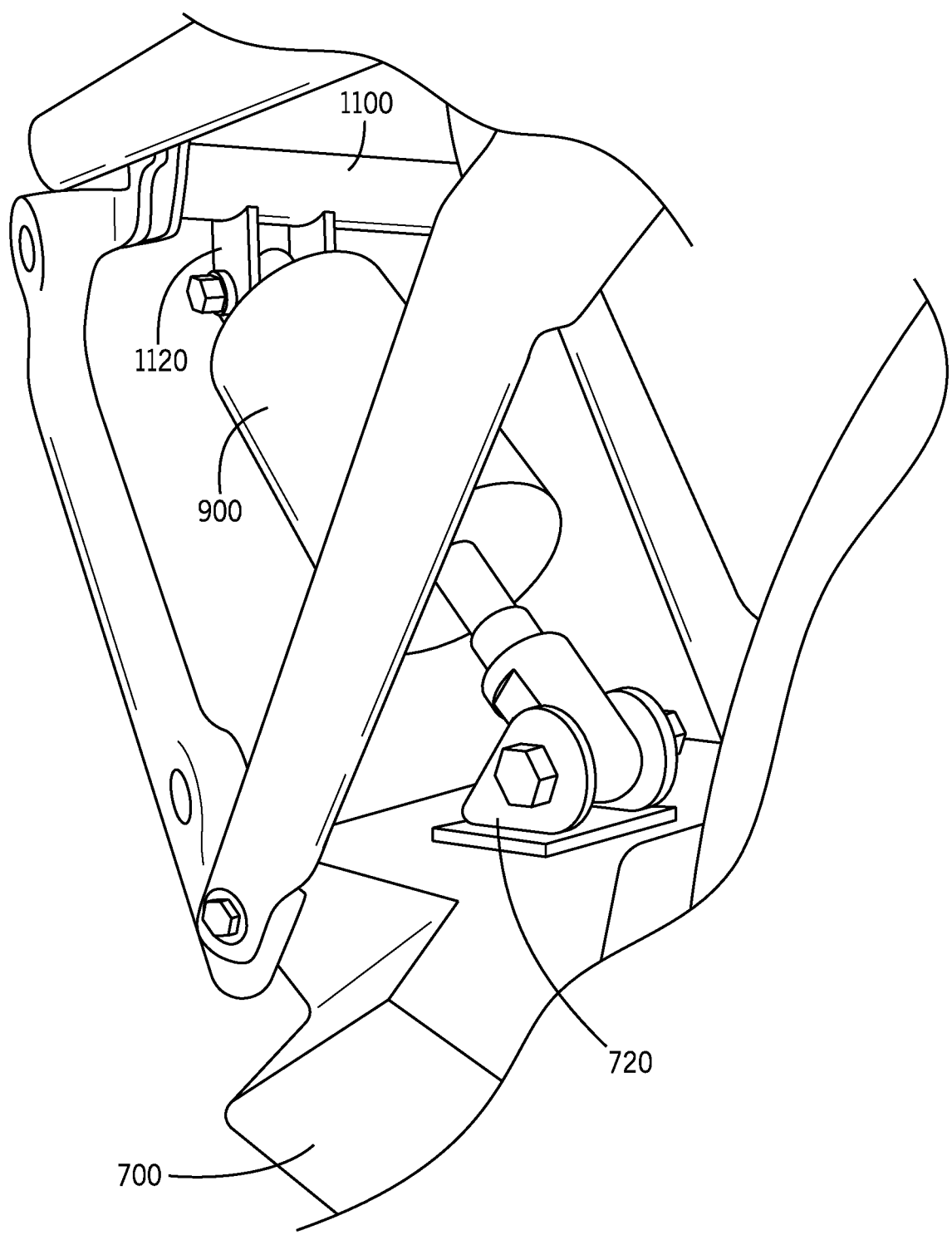
FIG. 13 is a left-rear perspective view of the installment of FIG. 11A.
Figure 20:
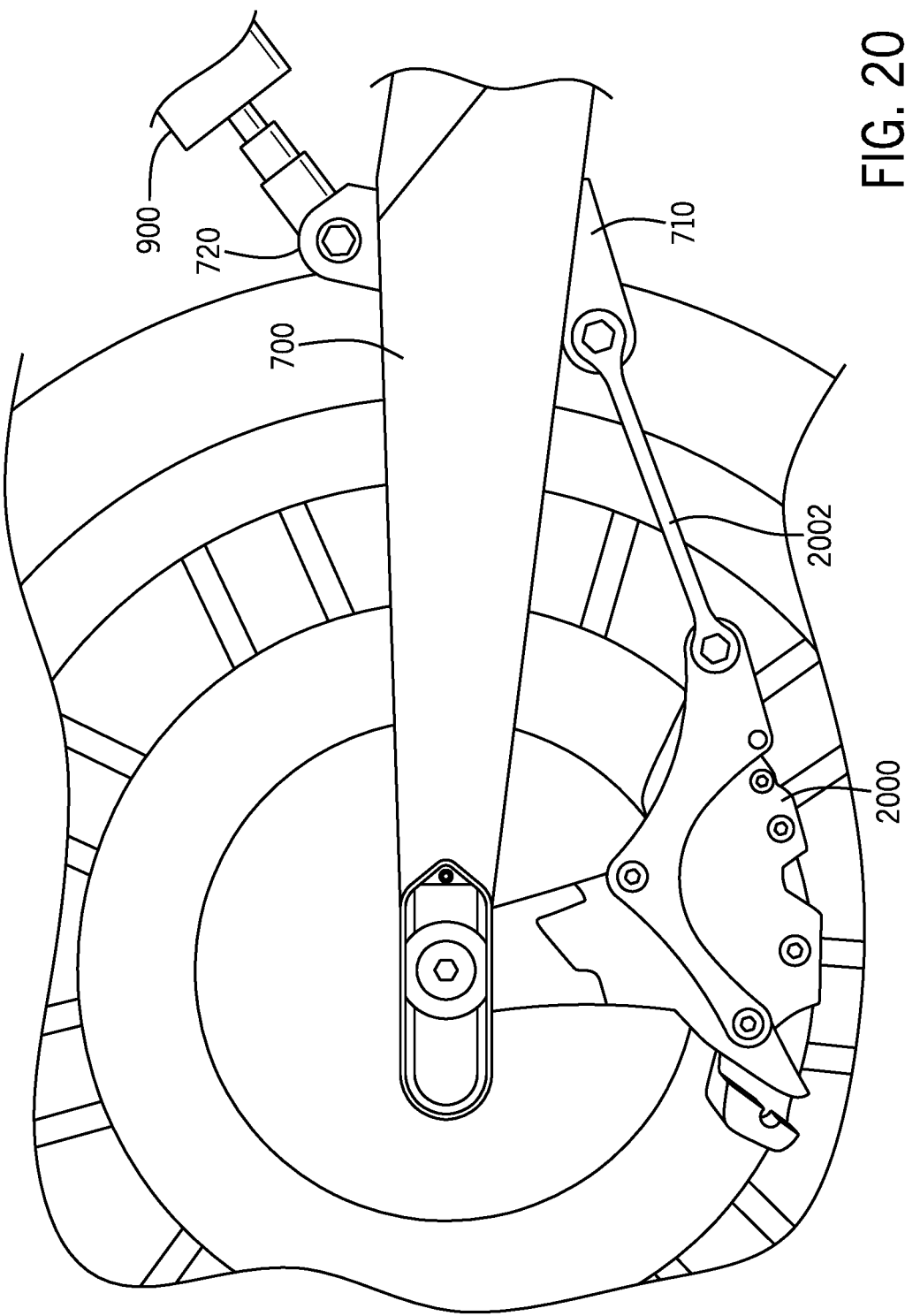
FIG. 20 is a right side view of another embodiment of a swing arm with a lower shock mount for a monoshock.

FIGS. 7 and 8 illustrate an exemplary swing arm 700, which may be a component of the present monoshock mount assembly, or may be an existing (i.e., factory) swing arm modified to accommodate the monoshock configuration. FIGS. 9 and 10 show the swing arm 700 mounted to the motorcycle frame and having a rear wheel of the motorcycle mounted thereto. A pivot 702 at the forward end attaches to the motorcycle frame using an axle 910 disposed through the pivot 702 such that the swing arm 700 may rotate around the axis of the pivot 702. Wheel mounts 704, 706 at the rearward end of the swing arm 700 attach to the rear wheel of the motorcycle, as shown in FIGS. 9 and 10. A lower shock mount 720 is attached to or integral with the body of the swing arm 700. In one embodiment, as illustrated, the lower shock mount 720 may be positioned on a top surface of the swing arm 700. In other embodiments, the lower shock mount 720 may be within the body of the swing arm 700 or on the underside of the swing arm 700, or in any other suitable location that allows the monoshock to be attached to the lower shock mount 720 as described below. As shown in FIG. 20, to accommodate the use on the motorcycle of certain rear brake calipers 2000, the swing arm 700 may further include a lower brake caliper retainer bracket 710 disposed in a suitable position, such as on the bottom surface of the swing arm 700, for connecting a linkage 2002 of the caliper 2000 thereto.

As shown in FIGS. 11A-C, 12, and 13, a shock absorber 900 pivotably attaches at its distal end to the lower shock mount 720. In various embodiments, the shock absorber 900 may pivotably attach at its proximal end to the motorcycle frame, to the replacement body mount assembly, and/or to a brace member 1100. The brace member 1100 may in some embodiments be a component of the present shock mount assembly. As illustrated, the brace member 1100 may be a bar, such as a hollow or solid cylindrical bar, that terminates in each end with a corresponding mounting bracket 1102, 1104. The brace member 1100 may attach to the motorcycle frame 530 via the existing attachment points 560 as described above; in some embodiments, including the illustrated embodiment, holes in the mounting brackets 1102, 1004 align with holes in the mounting brackets 510, 512 of the front frame members 504, 505 and with holes of the attachment points 560, such that bolts may be secured therethrough.

An upper shock mount 1120 may be attached to or integral with the brace member 1100, The upper shock mount 1120, like the lower shock mount 720, may be a through-bracket whereby a bolt may secure the proximal end of the shock absorber 900 to the upper shock mount 1120. In some embodiments, including those illustrated, the body of the shock absorber 900 is retained by the upper shock mount 1120 and is thereby secured to the motorcycle frame 530, and the distal end of the piston of the shock absorber 900 is retained by the lower shock mount 720 and is thereby secured to the swing arm 700, both in pivoting configurations. The rotation of the swing arm 700 around the axle 910 is thus dampened by the shock absorber 900, The upper shock mount 1120 may be aligned laterally with the lower shock mount 720 as illustrated, or in other embodiments the shock mounts 720, 1120 may be laterally offset. Further, each of the shock mounts 720, 1120 may be positioned at any suitable location laterally along the respective structures to which the shock mounts 720, 1120 are attached. In one example, the shock mounts 720, 1120 may be aligned along the longitudinal centerline of the motorcycle. In various other examples, including the illustrated embodiments, the shock mounts 720, 1120 may be any suitable lateral distance off-center. For example, the shock mounts 720, 1120 may be disposed off-center a suitable distance to provide a minimum necessary clearance between the shock absorber 900 and any motorcycle components installed within the motorcycle frame or within the body mount assembly 100, 500.

Figure 14:
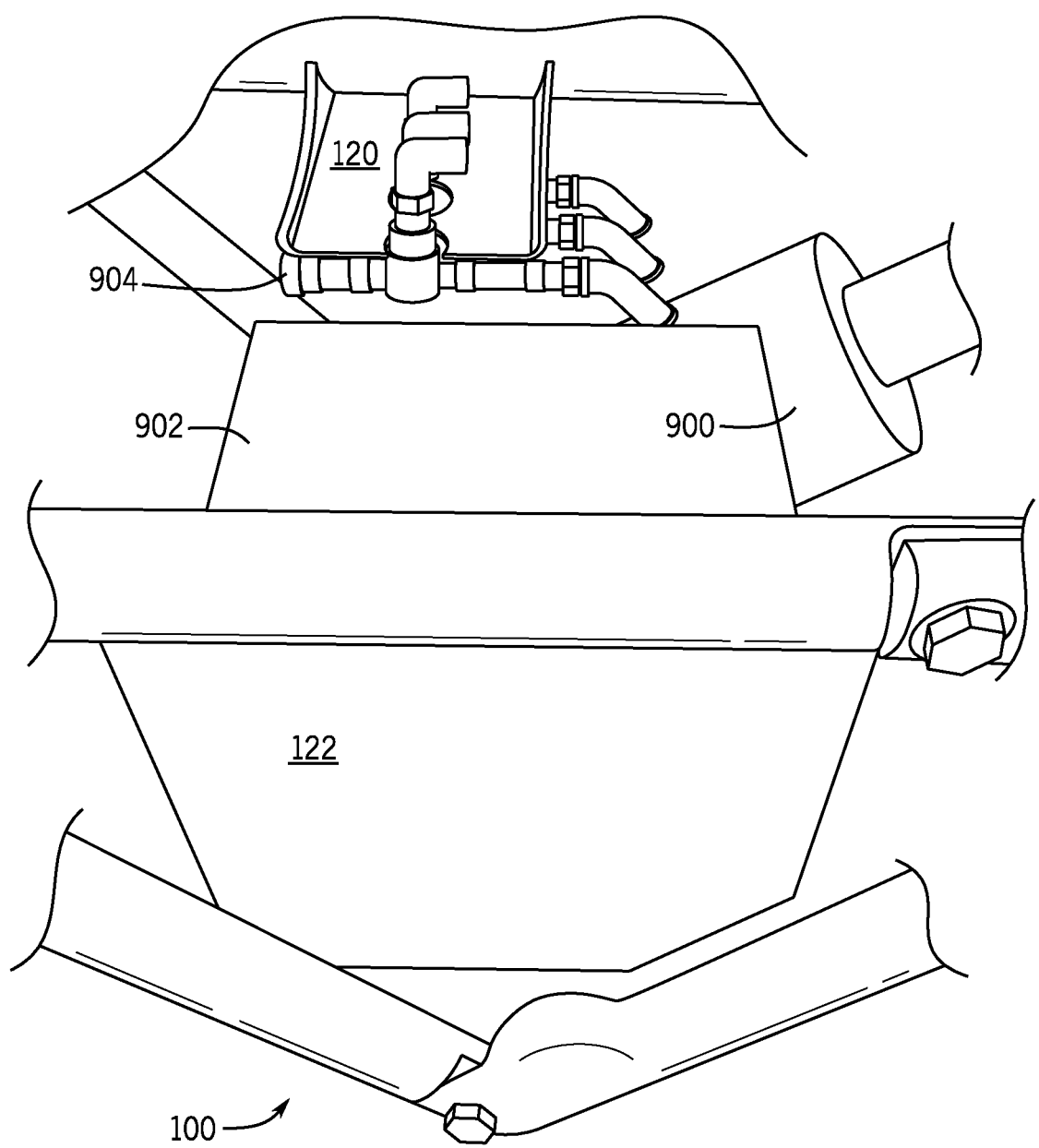
FIG. 14 is a top-right perspective view of the first embodiment of the body mount assembly shown with a monoshock, an air valve assembly, and a battery installed in the body mount assembly.
Figure 15:
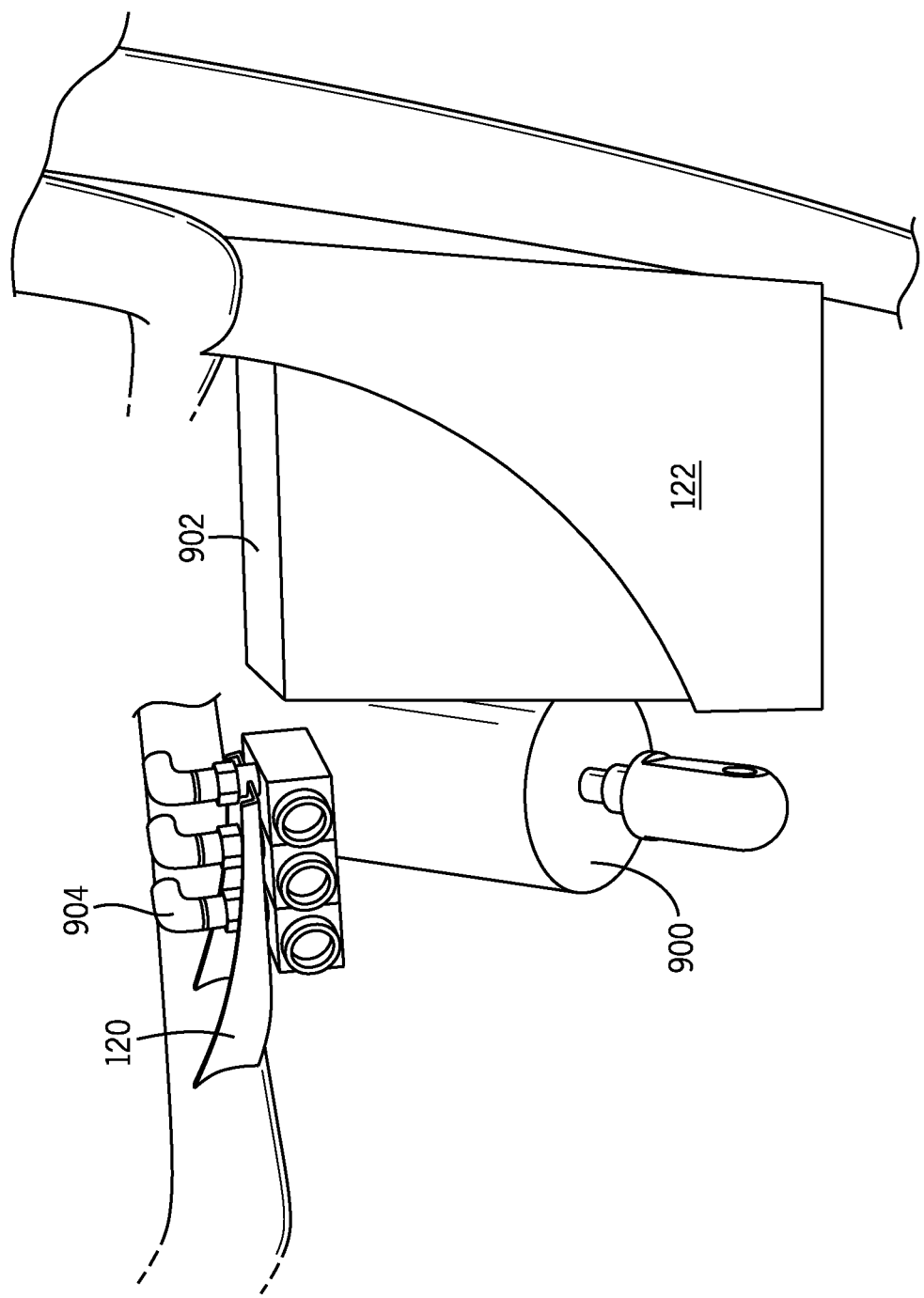
FIG. 15 is a close-up rear view of the installment of FIG. 14 showing the air valve assembly and the battery installed in the body mount assembly.
Figure 16:
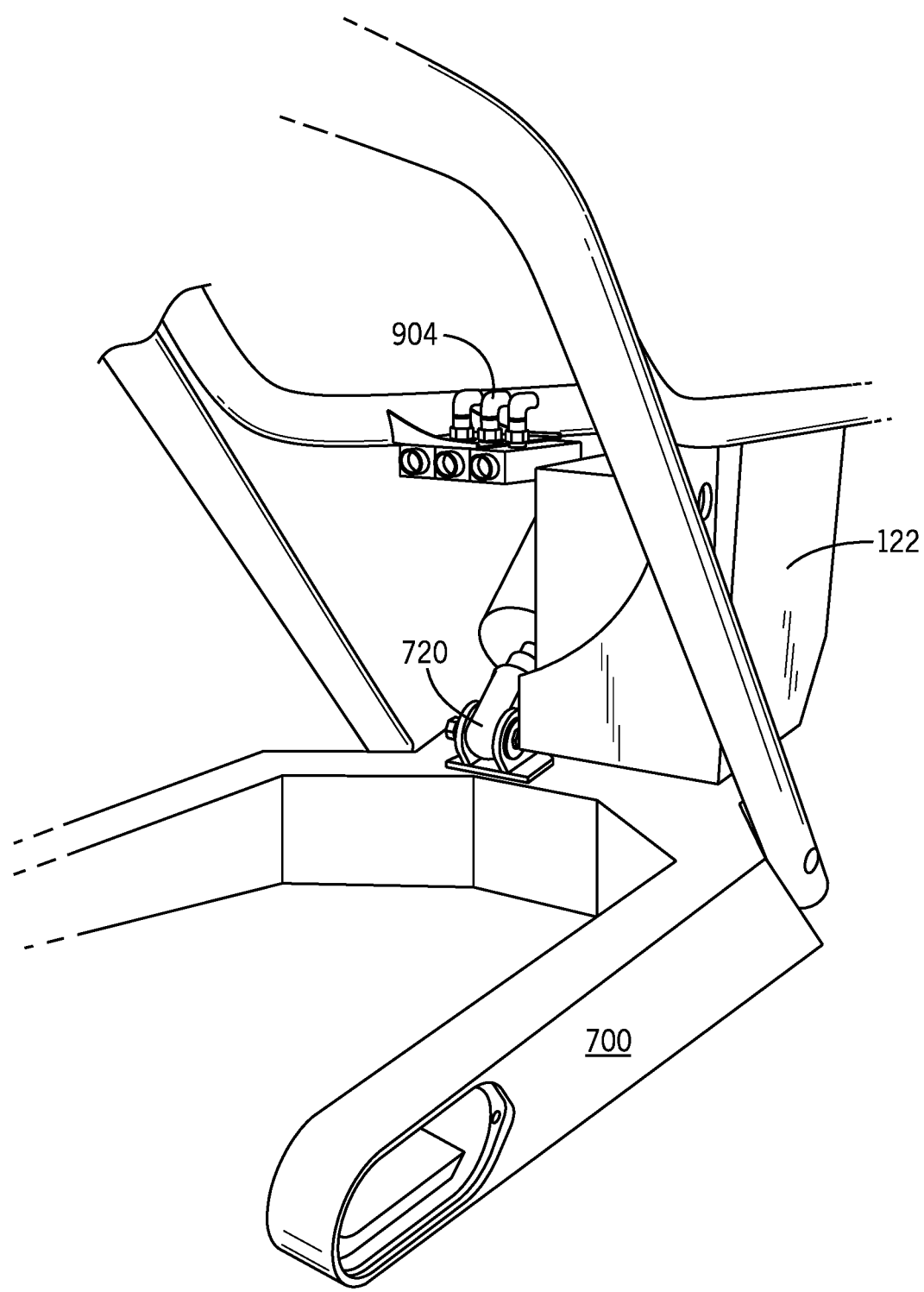
FIG. 16 is a rear-top-right perspective view of the installment of FIG. 14 showing the monoshock linked to the lower shock mount.

FIGS. 14-16 illustrate this off-center positioning of the shock mounts 720, 1120 and/or shock absorber 900 with respect to the installation of certain motorcycle components once the present (e.g., body mount assembly 100) is attached to the motorcycle frame 530. Referring to FIG. 14, a battery 902 may be secured within the battery mount 122 and an air valve assembly 904, such as a manifold for an, air suspension system, may be secured to the manifold mount 120. The shock absorber 900 positioning may be evaluated to confirm the appropriate location of the shock mounts (not shown)—specifically, that the minimum clearance is obtained, allowing the shock absorber 900 to rotate, extend, and retract in normal operation without contacting the installed motorcycle components. FIG. 15 further shows that the shock absorber 900 is positioned a suitable lateral distance from the battery mount 122 and extends beneath the valve assembly 904 mounted on the manifold mount 120. FIG. 16 then shows the swing arm 700 installed on the motorcycle frame 530 and the shock absorber 900 attached to the lower shock mount 720.

Figure 17:
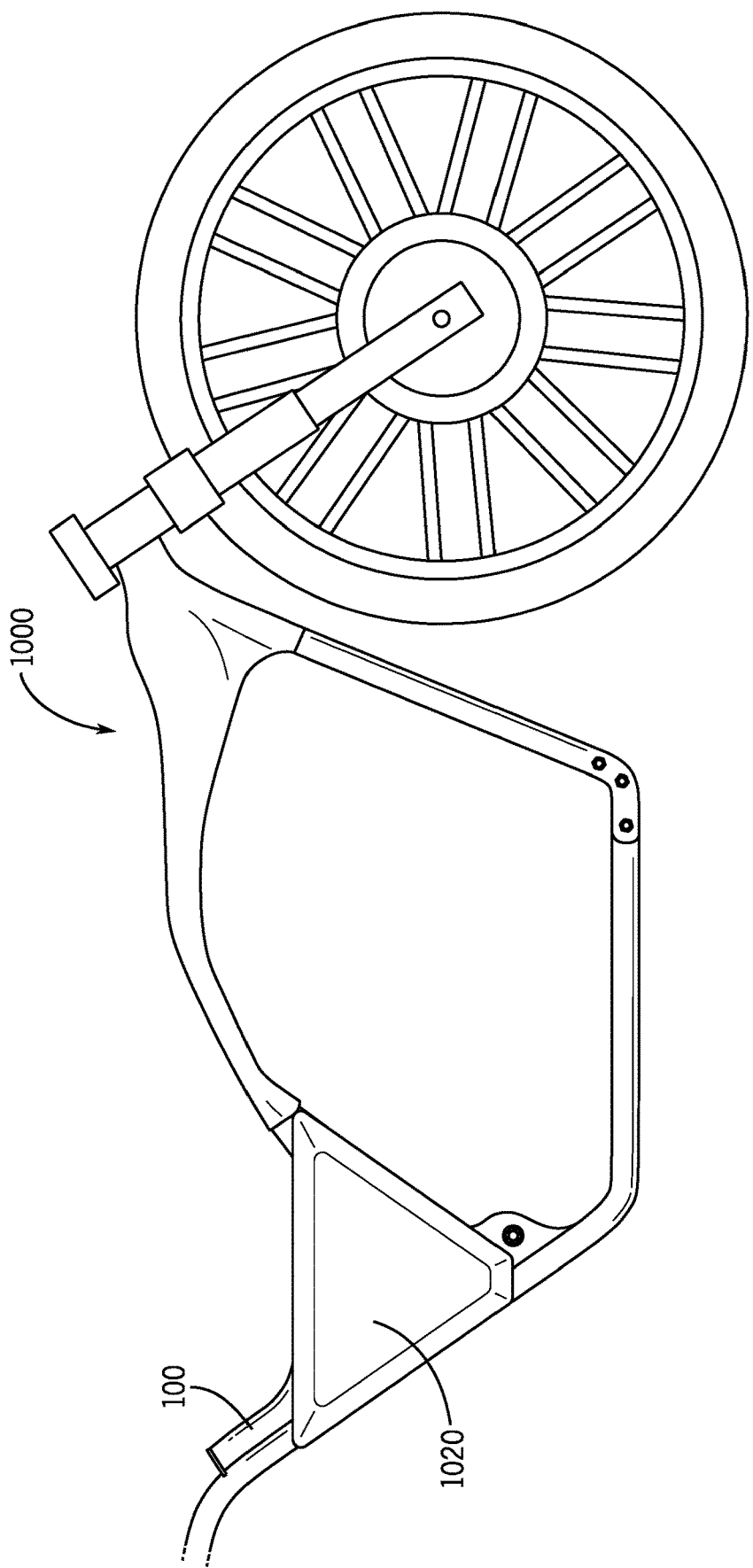
FIG. 17 is a right side view of a motorcycle frame with the first embodiment of the body mount assembly installed.

FIG. 17 illustrates the ability of the present body mount assembly 100 to support bodywork of a motorcycle 1000. A bodywork panel 1020, which may be a decorative and/or a protective panel, may attach to one or more of the body mount assembly 100 frame members, using the intermediate brackets as described above, or via another attachment mechanism such as bolts or rivets attaching the panel 1020 to the frame member(s). As shown, the rear frame members 102, 104 of the body mount assembly 100 may extend rearward from the panel 1020 and may support additional bodywork, the motorcycle 1000 seat, storage components, light fixtures and components, and other motorcycle components as described herein.

Figure 18:
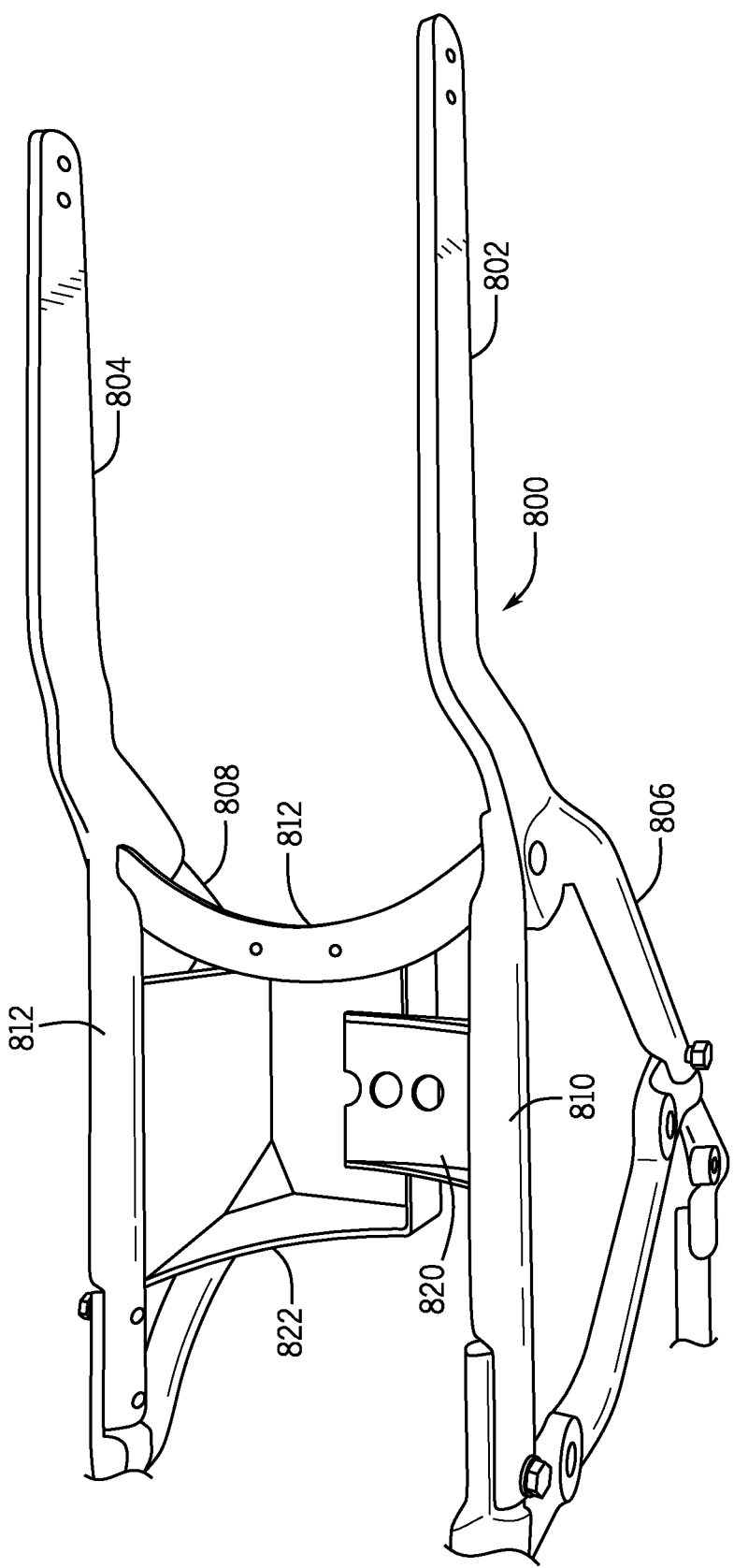
FIG. 18 is a top-left perspective view of another embodiment of a replacement body mount assembly for use in the present shock mount assembly.
Figure 19A:
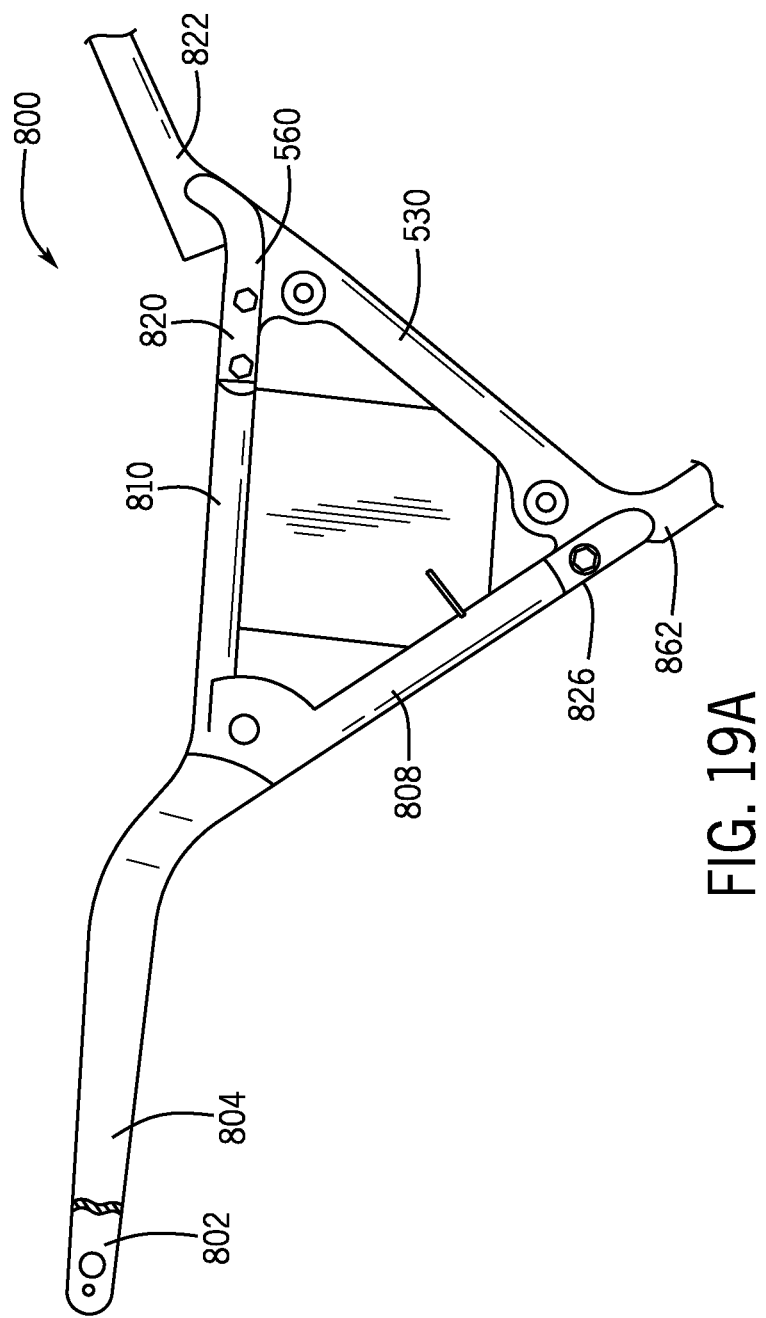
FIG. 19A is a right side view of a motorcycle frame with the body mount assembly of FIG. 18 installed.
Figure 19B:
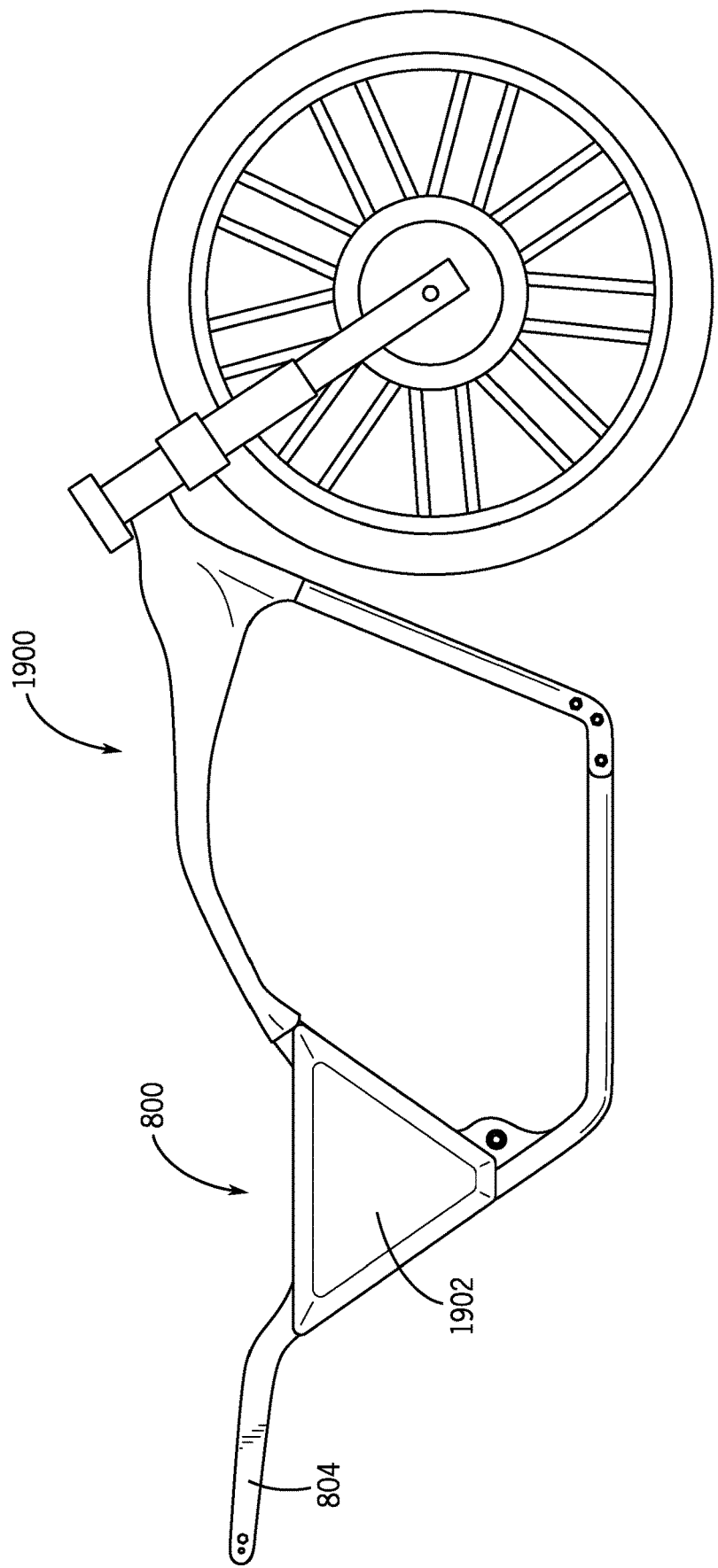
FIG. 19B is a right side view of the installation of FIG. 19A further showing bodywork, mechanical, and other parts of the motorcycle installed on the motorcycle frame.

FIGS. 18-19B illustrate another embodiment of a body mount assembly 800 of the present shock mount assembly. The body mount assembly 800 may include front frame members 810, 812 extending toward the front of the motorcycle, and rear frame members 802, 804 attached to or integral with the forward frame members 810, 812 and extending toward the rear of the motorcycle. Additional front frame members 806, 808 may extend downward and attach to the motorcycle frame. The front frame members 806-812 may each terminate with a mounting bracket, attaching to the motorcycle frame (e.g., via existing attachment points) as described above. One or more arcuate braces 818 may extend between any two opposite frame members to provide support to the body mount assembly 800. A manifold mount 820 as described above may extend from one of the frame members. A battery mount 822 as described above may also extend from one of the frame members. Mounted as shown in FIG. 19A, the body mount assembly 800 may support one or more bodywork components, such as a bodywork panel 1902 as shown in FIG. 19B; the rear frame members 802, 804 may extend rearward from the motorcycle 1900 as shown in FIG. 19B.

While the shock mount assembly and exemplary body mount assemblies 100, 500, 800 and swing arm 700 have been particularly shown and described with reference to preferred embodiments thereof, it will be understood by those skilled in the art that changes in form and detail may be made therein without departing from the spirit and scope of the invention.

What is claimed is:

1. A replacement shock mount assembly for a motorcycle having a factory configuration that includes a frame and a rear subframe attached to the frame via a plurality of attachment points, the replacement shock mount assembly configured to replace the rear subframe and comprising:
 a body mount assembly that structurally supports one or more bodywork components of the motorcycle, the body mount assembly comprising:
  a first front member that attaches to the frame at a first of the plurality of attachment points;
  a second front member that attaches to the frame at a second of the plurality of attachment points, the second front member spaced a first distance laterally from the first front member;
  a first brace spanning the first distance and providing structural support to the body mount assembly;
  a battery mount that structurally supports a battery of the motorcycle, the battery mount attached to the first front member; and
  a manifold mount that structurally supports one or both of a manifold and a valve assembly, the manifold mount attached to the second front member;
 a swing arm that pivotably attaches at a proximal end to the frame and at a distal end to a rear wheel of the motorcycle, the swing arm having a lower shock mount that pivotably attaches to a distal end of a shock absorber, the lower shock mount positioned offset from a centerline of the motorcycle; and
 an upper brace that attaches to the frame and pivotably attaches to a proximal end of the shock absorber, the upper brace, the swing arm, and the body mount assembly cooperating to provide a monoshock suspension of the motorcycle.

2. The replacement shock mount assembly of claim 1, wherein the first front member positions the battery mount and the second front member positions the manifold mount, and the upper and lower shock mounts are offset laterally from the centerline, such that while the shock absorber operates to dampen the pivoting of the swing arm with respect to the frame, the shock absorber maintains at least a minimum clearance from the battery mounted in the battery mount and from the valve assembly mounted in the manifold mount.

3. The replacement shock mount assembly of claim 1, wherein the body mount assembly further comprises:
 a third front member that attaches to the frame at a third of the plurality of attachment points and cooperates with the first front member to support a first bodywork panel; and
 a fourth front member that attaches to the frame at a fourth of the plurality of attachment points, that is spaced a second distance laterally from the third front member, and that cooperates with the second front member to support a second bodywork panel.

4. The replacement shock mount assembly of claim 3, wherein the battery mount is further attached to the third front member.

5. The replacement shock mount assembly of claim 1, wherein the upper brace is a tubular member extending the first distance and terminating in a first mounting bracket attaching to the frame at the first attachment point and a second mounting bracket attaching to the frame at the second attachment point, the upper brace having an upper shock mount that aligns laterally with the lower shock mount and pivotably attaches to the proximal end of the shock absorber.

* * * * *